(12) United States Patent
Morisawa et al.

(10) Patent No.: US 9,110,461 B2
(45) Date of Patent: Aug. 18, 2015

(54) SEMICONDUCTOR MANUFACTURING EQUIPMENT

(75) Inventors: Toshihiro Morisawa, Yokohama (JP); Daisuke Shiraishi, Hikari (JP); Satomi Inoue, Kudamatsu (JP); Akira Kagoshima, Kudamatsu (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 400 days.

(21) Appl. No.: 13/612,937

(22) Filed: Sep. 13, 2012

(65) Prior Publication Data
US 2013/0173042 A1 Jul. 4, 2013

(30) Foreign Application Priority Data

Dec. 28, 2011 (JP) .................................. 2011-288506

(51) Int. Cl.
*G05B 19/18* (2006.01)
*G05B 19/418* (2006.01)
(52) U.S. Cl.
CPC .. *G05B 19/4184* (2013.01); *G05B 2219/32191* (2013.01); *G05B 2219/45031* (2013.01)
(58) Field of Classification Search
None
See application file for complete search history.

(56) References Cited

U.S. PATENT DOCUMENTS

| | | | | |
|---|---|---|---|---|
| 5,815,397 | A * | 9/1998 | Saito et al. | 700/204 |
| 6,381,008 | B1 * | 4/2002 | Branagh et al. | 356/72 |
| 6,549,864 | B1 * | 4/2003 | Potyrailo | 702/81 |
| 2007/0050076 | A1 | 3/2007 | Yamazaki et al. | |
| 2011/0315661 | A1 | 12/2011 | Morisawa et al. | |

FOREIGN PATENT DOCUMENTS

| | | |
|---|---|---|
| JP | 2004-20193 | 1/2004 |
| JP | 2007-059585 | 3/2007 |
| JP | 2009-70071 | 4/2009 |
| JP | 2009-147183 | 7/2009 |
| JP | 2010-219263 | 9/2010 |
| JP | 2011-59790 | 3/2011 |

OTHER PUBLICATIONS

Toysha Walker et al., ISMI Predictive Preventive Maintenance Implementation Guideline, Technology Transfer #10105119A-TR International SEMATECH Manufacturing Initiative, Oct. 25, 2010.
Office Action in JP2011-288506, mailed Feb. 12, 2014, (in Japanese, 2 pgs.) [partial English language translation].

* cited by examiner

*Primary Examiner* — Sean Shechtman
(74) *Attorney, Agent, or Firm* — Baker Botts L.L.P.

(57) ABSTRACT

Semiconductor manufacturing equipment includes: a controller controlling driving and processes of various parts of the semiconductor manufacturing equipment, and a sensor monitoring each physical amount in the semiconductor manufacturing equipment or a status of each chemical response amount; a database; and an arithmetic section executing: processing of reading out equipment data, calculating a correlation matrix between time points based on a plurality of pieces of signal data to be compared, calculating eigen values and eigen vectors from the correlation matrix, and calculating principal component scores by principal component analysis; processing of comparing magnitudes of the eigen values of the principal components, arranging the eigen values in descending order to display a list thereof; and processing of displaying a scatter diagram where the principal component scores of the respective signals are plotted in a feature space selecting the principal component corresponding to the eigen value having a contribution ratio.

14 Claims, 27 Drawing Sheets

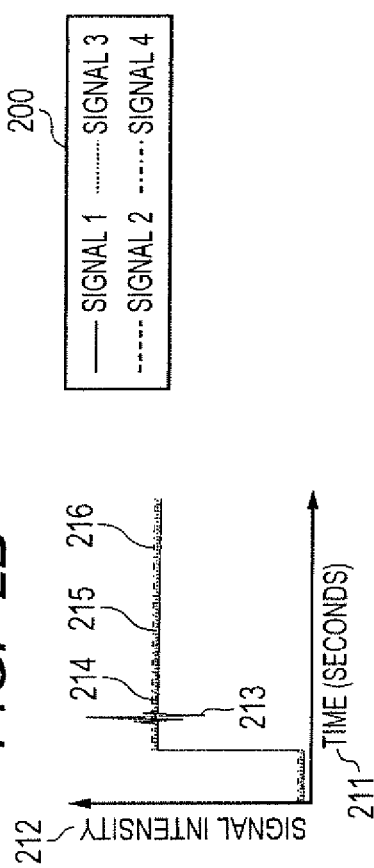
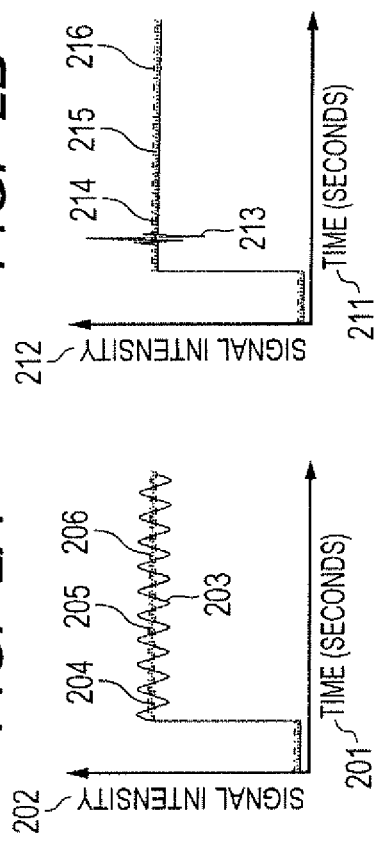
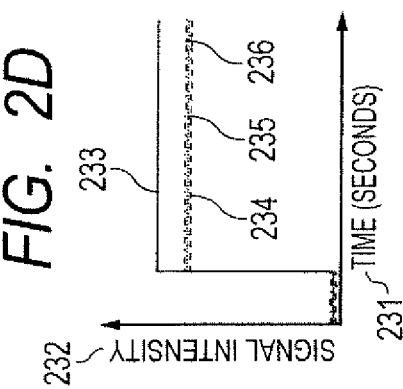
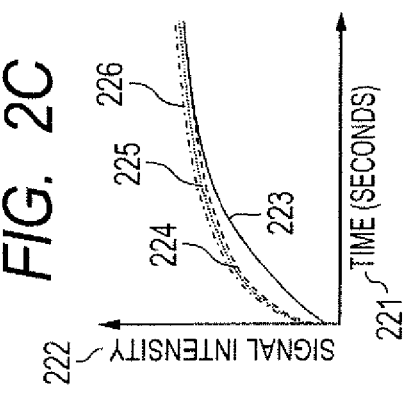

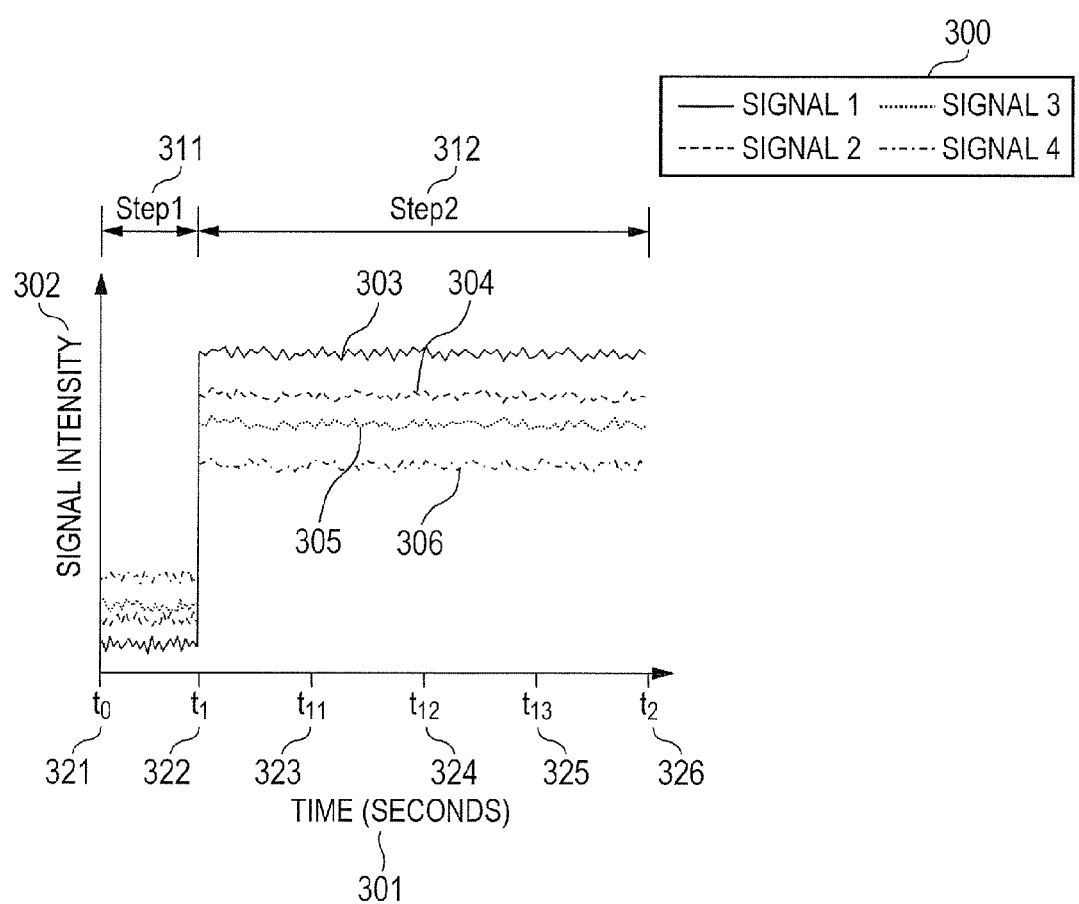

FIG. 10

| No | CR | CCR |
|---|---|---|
| 1 | 0.95 | 0.95 |
| 2 | 0.05 | 1.00 |
| 3 | 0.00 | 1.00 |
| 4 | 0.00 | 1.00 |
| 5 | 0.00 | 1.00 |
| 6 | 0.00 | 1.00 |
| 7 | 0.00 | 1.00 |
| 8 | 0.00 | 1.00 |
| 9 | 0.00 | 1.00 |
| 10 | 0.00 | 1.00 |
| 11 | 0.00 | 1.00 |
| 12 | 0.00 | 1.00 |
| 13 | 0.00 | 1.00 |
| 14 | 0.00 | 1.00 |
| 15 | 0.00 | 1.00 |
| 16 | 0.00 | 1.00 |
| 17 | 0.00 | 1.00 |
| 18 | 0.00 | 1.00 |
| 19 | 0.00 | 1.00 |
| 20 | 0.00 | 1.00 |

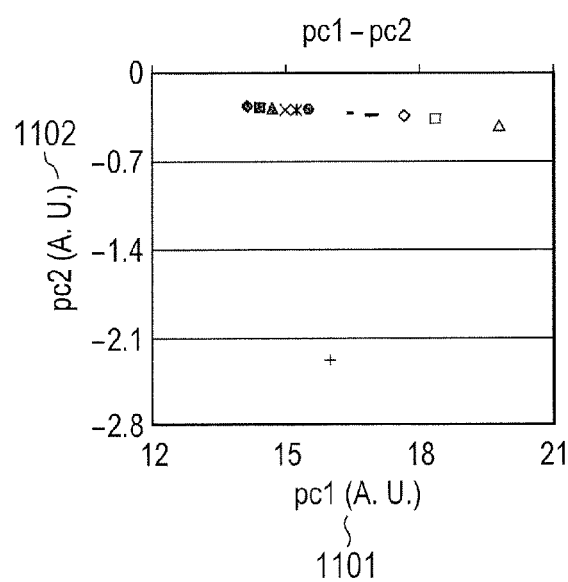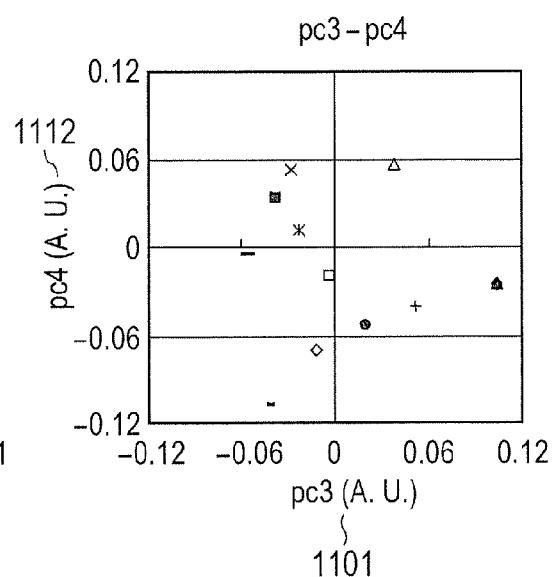

FIG. 13

|      | #001  | #002  | #003  | #004  | #005  | #006  | #007  | #008  | #009 | #010  | #011  | #012  |
|------|-------|-------|-------|-------|-------|-------|-------|-------|------|-------|-------|-------|
| #001 | 0.00  | 0.13  | 0.32  | 0.78  | 1.34  | 2.06  | 7.77  | 5.30  | 8.10 | 12.64 | 18.38 | 32.36 |
| #002 | 0.13  | 0.00  | 0.10  | 0.35  | 0.73  | 1.28  | 6.67  | 3.97  | 6.43 | 10.53 | 15.83 | 28.93 |
| #003 | 0.32  | 0.10  | 0.00  | 0.13  | 0.36  | 0.76  | 5.90  | 3.02  | 5.20 | 8.93  | 13.85 | 26.24 |
| #004 | 0.78  | 0.35  | 0.13  | 0.00  | 0.11  | 0.35  | 5.14  | 2.09  | 3.94 | 7.26  | 11.73 | 23.28 |
| #005 | 1.34  | 0.73  | 0.36  | 0.11  | 0.00  | 0.12  | 4.66  | 1.37  | 2.92 | 5.84  | 9.91  | 20.69 |
| #006 | 2.06  | 1.28  | 0.76  | 0.35  | 0.12  | 0.00  | 4.33  | 0.79  | 2.04 | 4.55  | 8.21  | 18.20 |
| #007 | 7.77  | 6.67  | 5.90  | 5.14  | 4.66  | 4.33  | 0.00  | 4.14  | 4.89 | 6.70  | 9.57  | 18.11 |
| #008 | 5.30  | 3.97  | 3.02  | 2.09  | 1.37  | 0.79  | 4.14  | 0.00  | 0.34 | 1.62  | 4.00  | 11.56 |
| #009 | 8.10  | 6.43  | 5.20  | 3.94  | 2.92  | 2.04  | 4.89  | 0.34  | 0.00 | 0.55  | 2.12  | 8.15  |
| #010 | 12.64 | 10.53 | 8.93  | 7.26  | 5.84  | 4.55  | 6.70  | 1.62  | 0.55 | 0.00  | 0.57  | 4.61  |
| #011 | 18.38 | 15.83 | 13.85 | 11.73 | 9.91  | 8.21  | 9.57  | 4.00  | 2.12 | 0.57  | 0.00  | 2.00  |
| #012 | 32.36 | 28.93 | 26.24 | 23.28 | 20.69 | 18.20 | 18.11 | 11.56 | 8.15 | 4.61  | 2.00  | 0.00  |

FIG. 14

| No (1401) | CR (1402) | CCR (1403) |
|-----------|-----------|------------|
| 1         | 0.90      | 0.90       |
| 2         | 0.10      | 1.00       |
| 3         | 0.00      | 1.00       |
| 4         | 0.00      | 1.00       |
| 5         | 0.00      | 1.00       |
| 6         | 0.00      | 1.00       |
| 7         | 0.00      | 1.00       |
| 8         | 0.00      | 1.00       |
| 9         | 0.00      | 1.00       |
| 10        | 0.00      | 1.00       |
| 11        | 0.00      | 1.00       |
| 12        | 0.00      | 1.00       |

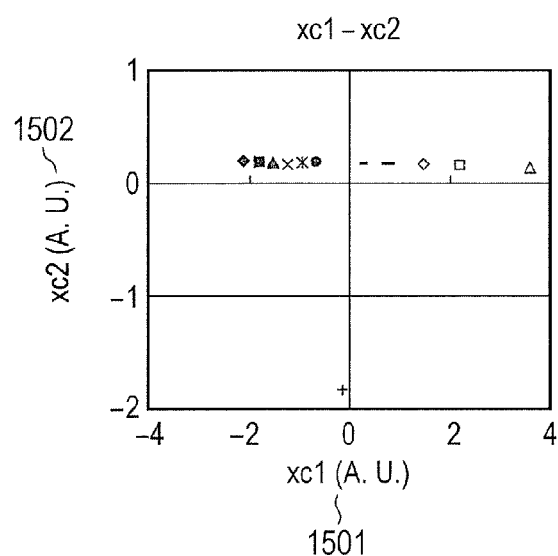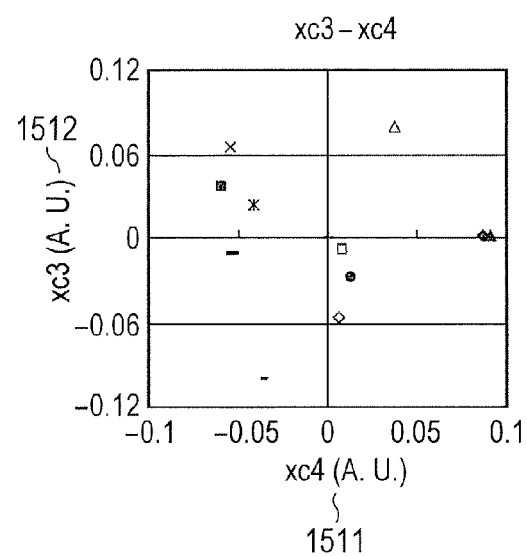
FIG. 15A
FIG. 15B

FIG. 16

| No | CR | CCR |
|---|---|---|
| 1 | 0.95 | 0.95 |
| 2 | 0.01 | 0.96 |
| 3 | 0.01 | 0.97 |
| 4 | 0.01 | 0.97 |
| 5 | 0.01 | 0.98 |
| 6 | 0.00 | 0.98 |
| 7 | 0.00 | 0.99 |
| 8 | 0.00 | 0.99 |
| 9 | 0.00 | 0.99 |
| 10 | 0.00 | 1.00 |
| 11 | 0.00 | 1.00 |
| 12 | 0.00 | 1.00 |
| 13 | 0.00 | 1.00 |
| 14 | 0.00 | 1.00 |
| 15 | 0.00 | 1.00 |
| 16 | 0.00 | 1.00 |
| 17 | 0.00 | 1.00 |
| 18 | 0.00 | 1.00 |
| 19 | 0.00 | 1.00 |
| 20 | 0.00 | 1.00 |

Columns: 1601, 1602, 1603

FIG. 19

|      | 1901 | 1902 | 1903 |
|------|------|------|------|
| No   | CR   | CCR  |
| 1    | 0.80 | 0.80 |
| 2    | 0.12 | 0.92 |
| 3    | 0.03 | 0.95 |
| 4    | 0.03 | 0.98 |
| 5    | 0.02 | 1.00 |
| 6    | 0.00 | 1.00 |
| 7    | 0.00 | 1.00 |
| 8    | 0.00 | 1.00 |
| 9    | 0.00 | 1.00 |
| 10   | 0.00 | 1.00 |
| 11   | 0.00 | 1.00 |
| 12   | 0.00 | 1.00 |
| 13   | 0.00 | 1.00 |
| 14   | 0.00 | 1.00 |
| 15   | 0.00 | 1.00 |
| 16   | 0.00 | 1.00 |
| 17   | 0.00 | 1.00 |
| 18   | 0.00 | 1.00 |
| 19   | 0.00 | 1.00 |
| 20   | 0.00 | 1.00 |

FIG. 22

| | 2201 | 2202 | 2203 |
|---|---|---|---|
| No | CR | CCR |
| 1 | 0.60 | 0.60 |
| 2 | 0.30 | 0.90 |
| 3 | 0.05 | 0.95 |
| 4 | 0.03 | 0.98 |
| 5 | 0.02 | 1.00 |
| 6 | 0.00 | 1.00 |
| 7 | 0.00 | 1.00 |
| 8 | 0.00 | 1.00 |
| 9 | 0.00 | 1.00 |
| 10 | 0.00 | 1.00 |
| 11 | 0.00 | 1.00 |
| 12 | 0.00 | 1.00 |

FIG. 24

| No | CR | CCR |
|---|---|---|
| | 2401 | 2402 | 2403 |

| No | CR | CCR |
|---|---|---|
| 1 | 0.83 | 0.83 |
| 2 | 0.10 | 0.93 |
| 3 | 0.04 | 0.97 |
| 4 | 0.03 | 1.00 |
| 5 | 0.00 | 1.00 |
| 6 | 0.00 | 1.00 |
| 7 | 0.00 | 1.00 |
| 8 | 0.00 | 1.00 |
| 9 | 0.00 | 1.00 |
| 10 | 0.00 | 1.00 |
| 11 | 0.00 | 1.00 |
| 12 | 0.00 | 1.00 |
| 13 | 0.00 | 1.00 |
| 14 | 0.00 | 1.00 |
| 15 | 0.00 | 1.00 |
| 16 | 0.00 | 1.00 |
| 17 | 0.00 | 1.00 |
| 18 | 0.00 | 1.00 |
| 19 | 0.00 | 1.00 |
| 20 | 0.00 | 1.00 |

EMBODIMENT 1, IT-PCA, pc2

EMBODIMENT 2, IT-PCA, pc3

| SEMICONDUCTOR MANUFACTURING EQUIPMENT ID | | | | |
|---|---|---|---|---|
| LOT OR WAFER ID | MANUFACTURING PROCESS ID | MANUFACTURING RECIPE ID | MANUFACTURING DATE AND TIME | |

| SIGNAL ID | OBSERVATION STARTING DATE AND TIME | OBSERVATION ENDING DATE AND TIME | SAMPLING INTERVAL | CHRONOLOGICAL EQUIPMENT DATA |
|---|---|---|---|---|
| sig-1 | 10.18.09.20.10.00 | 10.18.09.26.25.50 | 0.50 | ..., ..., ..., ..., ...... |
| sig-2 | 10.18.09.20.10.00 | 10.18.09.26.25.50 | 0.50 | ..., ..., ..., ..., ...... |
| sig-3 | 10.18.09.20.14.50 | 10.18.09.26.30.00 | 0.50 | ..., ..., ..., ..., ...... |
| sig-4 | 10.18.09.20.10.00 | 10.18.09.26.28.00 | ---------- | ---------- |
| ---------- | | | | |

SEMICONDUCTOR MANUFACTURING EQUIPMENT

CLAIM OF PRIORITY

The present application claims priority from Japanese application serial no. JP2011-288506, filed on Dec. 28, 2011, the content of which is hereby incorporated by reference into this application.

BACKGROUND OF THE INVENTION

1. Technical Field of the Invention

The present invention relates to semiconductor manufacturing equipment, which includes equipment and a sensor monitoring statuses of various portions at time of equipment operation, including equipment which performs process processing by acquiring a map permitting quantitative judgment of waveform similarity based on compared values (matrix) between processing by use of equipment monitor signal data (waveforms) during a plurality of wafer processing, and which monitors the semiconductor manufacturing equipment.

The invention more specifically relates to a function of quantifying difference between signals even under the presence of signals which cannot have correlation between the signals and which have, as signal change during processing, not only change such as ramp and drift but also change including noise magnitude, variation such as hunting, and further shift (offset of signal value) and a step.

2. Description of Related Arts

A large scale integrated circuit (LSI) is formed by using many kinds of semiconductor manufacturing equipment by forming on a silicon (Si) wafer devices composed of, for example, a gate electrode and repeating dielectric film deposition and wiring formation. For the purpose of achieving higher LSI performance, higher function, and productivity improvement, minituarization of devices and circuits have been advanced, and according to ITRS (International Technology Roadmap for Semiconductor), a minimum line width of a gate electrode has become 45 nm in 2010. In addition, a manufacturing method has become more complicated. Accordingly, machining accuracy of various kinds of process equipment has improved, and further multiple function addition/informatization, for example, sensor addition and inclusion of a function of accumulating equipment data at short sampling intervals during processing have been advanced.

In an LSI wafer production line, while manufacturing condition has been optimized in order to ensure machining accuracy, efforts to prevent production volume reduction by way of equipment maintenance and problem measures have been advanced. According to, for example, International SEMATECH Manufacturing Initiative, ISMI Predictive Preventive Maintenance Implementation Guideline, Technology Transfer #10105119A-TR, described is that in order to realize Condition-based Maintenance (CBM) and Predictive Maintenance (PdM) for problem occurrence, semiconductor manufacturing equipment uses equipment raw data. This equipment raw data is equipment data at short sampling intervals during processing. In the LSI wafer production line, this equipment data is analyzed to thereby diagnose an equipment status and monitor fault occurrence.

In LSI wafer manufacturing, various kinds of semiconductor manufacturing equipment are used. For example, in order to form a device, an oxidized thin film is formed by thermal oxidation equipment, a gate electrode film is deposited by LPCVD (Low Pressure Chemical Vapor Deposition) equipment, a resist pattern is formed by equipment such as exposure equipment, and then a gate electrode is formed by etching equipment. Moreover, in the wiring formation, a dielectric film is deposited by, for example, plasma CVD equipment, a resist pattern is formed, and then a hole and a groove are formed by the etching equipment. Then copper is filled in the hole and the groove by plating equipment and the copper on a wafer surface is removed by CMP (Chemical Mechanical Polishing) equipment. Moreover, depending on required machining performance and machining accuracy, equipment to be used are selected. There are various models for equipment, and there are also a plurality of semiconductor equipment vendors. The LSI wafer is processed by a wide variety of equipment.

Such a wide variety of manufacturing equipment are used in an LSI production plant. For the purpose of improving productivity, facility informatization has been advanced in the plant. The plant and each of the equipment are connected together by a network, and communication is made based on communication standards that are common between the different equipment. Moreover, multiple function addition/informatization as described above have already been advanced. Shown in International SEMATECH Manufacturing Initiative, ISMI Predictive Preventive Maintenance Implementation Guideline, Technology Transfer #10105119A-TR is a method of, for all the semiconductor manufacturing equipment in general, performing the equipment status diagnosis and the fault monitoring by use of the equipment (raw) data. Data items and contents vary depending on the equipment and a process, but the equipment data itself can be analyzed as a signal at short sampling intervals by a common method.

FIG. 1 shows configuration of plasma etching equipment as an example of the semiconductor manufacturing equipment. In FIG. 1, the etching equipment 101 is composed of: a chamber 102, an electrode 103, a wafer 105, an electrode 106, an exhaust system 107, a gas supply system 108, an equipment controller-outside communication equipment 109, an OES (Optical Emission Spectrometry) 110, a calculator-storage equipment 111 as a calculator system, a screen-user interface 112 as a terminal, flow rate adjustment equipment 113, pressure adjustment equipment 114, power adjustment equipment 115, and temperature adjustment equipment 116. The chamber 102 is provided with a window 121, and light 122 provided by plasma can be observed by the OES 110.

The etching equipment 101 is connected to an equipment data DB 132 via a network 131, and also equipment data monitoring equipment 133 as a calculator system which achieves convenience of data sharing and which monitors and analyzes equipment data of a plurality of semiconductor manufacturing equipment is also connected to the network 131. Needless to say, the equipment data monitoring equipment 133 may be included inside the semiconductor manufacturing equipment 101, in which case the calculator-storage equipment 111 performs processing.

The etching equipment 101 includes the flow rate adjustment equipment 113, the pressure adjustment equipment 114, the power adjustment equipment 115, and the temperature adjustment equipment 116 as actuators, which can adjust flow rates of various gas materials, pressure inside the chamber 102, current and voltage applied to the electrodes 103 and 106, and temperature, respectively. These adjustments are executed based on instructions of the equipment controller-outside communication equipment 109. Pieces of data obtained by monitoring driving signals of these adjustments serve as pieces of equipment data. These pieces of equipment data are signals of the adjustment equipment that operate based on values previously instructed for each time point (processing step), and thus basically become signals with constant values between the time points although noise is put in the signals. There is no correlation between the plurality of signals.

A plasma 104 is involved in light emission, and a wavelength and intensity of this light depend on presence of ionized and dissociated atoms and molecules in the plasma and presence of a substance generated through etching response. Thus, for this light 122, light emission intensity is monitored by the OES 110 on an individual wavelength basis. OES data is data obtained by observing process response but data sampled at short time intervals, and is thus treated as equipment data. Since this data is a signal indicating chemical response in etching processing, that is, an increase and a decrease in the reacting substance, a signal value varies. There is correlation between the plurality of signals.

FIGS. 2A to 2D show examples of equipment data. FIGS. 2A, 2B, 2C, and 2D show four signals shown in a legend 200, where the signal 1 is a faulty signal and the signals 2, 3, and 4 are signals substantially identical to each other. In the signal 1 203 in FIG. 2A, pulsation is put. In the signal 1 213 of FIG. 2B, hunting occurs. In the signal 1 223 of FIG. 2C, an intensity increase is delayed at a time axis. The signal 1 233 of FIG. 2D is shifted. There is correlation between waveforms in FIGS. 2A and 2C, but presence and absence of pulsation of FIG. 2A cannot be detected based on correlation. Although there is no correlation between waveforms in FIGS. 2B and 2D, noise needs to be detected in FIG. 2B and signal intensity difference needs to be detected in FIG. 2D. Moreover, in a signal obtained by actually monitoring the equipment, noise (variation) such as white noise is included. Accordingly, between the plurality of signals obtained by monitoring the equipment, there are various relationships related to changes, such as whether or not there is correlation, where or not there is variation and whether the variation is large or small, and whether or not there is signal intensity difference.

There are various characteristic signal change patterns (waveform patterns), and thus they are not limited to those shown in FIGS. 2A to 2D, but by detecting such signal change, fault occurrence needs to be judged to take measures against equipment problems and perform maintenance and also preparatory planning processing such as pre-processing and post-processing for preventing problem occurrence needs to be carried out. Moreover, appearing waveform patterns are various, and it is also not necessarily possible to specify beforehand what waveform pattern occurs.

Described in Japanese Patent Application Laid-Open Publication No. 2009-70071 are mainly a threshold setting method with good accuracy in fault detection and a method of obtaining statistic. Described are reasons why principal component analysis PCA using time-series correlation of each item and partial least square PLS are used and fault diagnosis is performed by performing signal processing such as Fourier transformation and wavelet transformation.

Described in Japanese Patent Application Laid-Open Publication No. 2009-147183 is that, with a target put on etching equipment as semiconductor manufacturing equipment, a signal is divided into a baseline component (low-frequency component) and a high-frequency component by short-time Fourier transformation and noise occurrence in particular is detected.

Described in Japanese Patent Application Laid-Open Publication No. 2011-59790 is a method of setting a threshold in design-based and case-based fault detection. Shown are methods of converting signal data into a space of feature amount for the purpose of fault detection, and listed as these methods are: the principal component analysis, independent component analysis ICA, non-negative matrix factorization NMF, projection to latent structure PLS, and canonical correlation analysis CCA. In any case, times-series correlation between signal items or independence relationship between the signal items are analyzed and put into feature amounts. Note that this independence relationship means that there is no correlation.

Described in Japanese Patent Application Laid-Open Publication No. 2004-20193 is a method of dividing a signal into different time zones and performing Fourier transformation and performing the principal component analysis on a spectrum on an individual time zone basis to judge a fault of facility based on a principal component score. This signal is vibration data, acoustic data.

Described in Japanese Patent Application Laid-Open Publication No. 2010-219263 is a method of, with a target put on a plurality of OES signals (waveforms), dividing an OES signal by using time-series correlation to obtain a representative waveform pattern. Also shown is a method of identifying a signal without any change.

The invention relates to a method of, in semiconductor manufacturing equipment capable of monitoring equipment data (signal) at short sampling intervals during manufacturing processing, analyzing the equipment data to thereby monitor fault occurrence in the equipment. The equipment data to be monitored include: those (for example, flow rate, pressure, current, voltage, and temperature) which have no correlation between a plurality of signals; and those (for example, OES data with a change in a signal value during chemical response) which have correlation between a plurality of signals. The plurality of signals to be analyzed include: a plurality of signals with different signal items; and a plurality of signals with the same signal items from the past to the present in repeated process processing. As examples of a waveform pattern expressing a signal fault, there are: noise such as the pulsation (FIG. 2A) and the hunting (FIG. 2B); and changes such as the delay (FIG. 2C) and the shift (FIG. 2D), but they are not limited to those, and thus an unexpected waveform pattern that cannot be predicted beforehand is also included. Thus, it is an object to analyze a plurality of actually sampled signals regardless of whether or not there is correlation between the signals in time series to express difference between the signals.

Described in Japanese Patent Application Laid-Open Publication No. 2009-70071 is that, as signal processing for fault detection, processing using correlation and also processing of acquiring a frequency component are used. This does not make it possible to detect difference between signals also having no frequency component since there is no correlation such as, for example, the shift in FIG. 2D.

In Japanese Patent Application Laid-Open Publication No. 2009-147183, regardless of whether or not there is correlation, a fault cannot be detected based on intensity change in time series in a sampled signal.

The various kinds of signal data transformation methods listed in Japanese Patent Application Laid-Open Publication No. 2011-59790 are basically based on correlation between signals. The independence component analysis ICA is described as a method of breaking down a signal into a sum of signals that are not white noise, and the Non-Negative Matrix Factorization NMF is described as a method of breaking down a signal into a product of a non-negative matrix. These processing are used in acoustic signal processing and image signal processing, and are analysis methods of extracting characteristics from data having noise mixed in the signal.

Thus, they are not methods of analyzing difference between a plurality of signal changes, which is shown in, for example, FIG. 2A to 2D.

Japanese Patent Application Laid-Open Publication No. 2004-20193 is limited to processing on a signal having a frequency component.

Japanese Patent Application Laid-Open Publication No. 2010-219263 is limited to data having correlation. Moreover, for identification of a signal without any change, difference between a plurality of signals is not analyzed, and thus identification of a signal as shown in FIG. 2D cannot be performed.

It is an object of the present invention to express difference between a targeted plurality of signals regardless of whether or not there is correlation between the signals in time-series and also without previously assuming a waveform pattern. According to an aspect of the invention, it is possible to detect a fault with a signal change indicating any waveform pattern fault. Moreover, unlike a conventional method based on detection of correlation between signals, it is possible to detect slight change difference between the signals without obtaining correlation. Since the difference can be expressed by using only the obtained plurality of signals, previous parameter setting and waveform pattern setting are not required and its usage is also made easier.

SUMMARY OF THE INVENTION

To address the problem described above, one aspect of the present invention refers to semiconductor manufacturing equipment including configuration for realizing wafer process processing and preparatory processing. The semiconductor manufacturing equipment includes: a controller controlling driving and processes of various parts of the semiconductor manufacturing equipment, and a sensor monitoring each physical amount in the semiconductor manufacturing equipment or a status of each chemical response amount; a database storing equipment data obtained by sampling, at predetermined intervals, output signals of the controller and the sensor of the semiconductor manufacturing equipment being manufactured; and an arithmetic section executing: processing of searching the database for the equipment data of the semiconductor manufacturing equipment to be evaluated, reading out the equipment data to be analyzed, calculating a correlation matrix between time points based on a plurality of pieces of signal data to be compared, calculating eigen values and eigen vectors from the correlation matrix, and calculating principal component scores by principal component analysis; processing of comparing magnitudes of the eigen values of the principal components, arranging the eigen values in descending order to display a list thereof on a user interface screen, thereby enabling determination of the eigen value having a contribution ratio; and processing of displaying on the user interface screen a scatter diagram where the principal component scores of the respective signals are plotted in a feature space where the principal component corresponding to the eigen value having the contribution ratio is selected.

To address the problem described above, another aspect of the invention refers to semiconductor manufacturing equipment including configuration for realizing wafer process processing and preparatory processing. The semiconductor manufacturing equipment includes: a controller controlling driving and processes of various parts of the semiconductor manufacturing equipment, and a sensor monitoring each physical amount in the semiconductor manufacturing equipment or a status of each chemical response amount; a database storing equipment data obtained by sampling, at predetermined intervals, output signals of the controller and the sensor of the semiconductor manufacturing equipment being manufactured; and an arithmetic section executing: processing of searching the database for the equipment data of the semiconductor manufacturing equipment to be evaluated, reading out the equipment data to be analyzed, between any two of a plurality of pieces of signal data to be compared, defining as distance between the signals a sum of squares of signal intensity difference over different sampling time points, obtaining a distance matrix and an inner product matrix, calculating eigen values and eigen vectors of the inner product matrix, and calculating a coordinate value of each signal in an MDS map by multi-dimensional scaling; processing of comparing magnitudes of the eigen values corresponding to the respective signals and arraying the magnitudes in descending order to display a list thereof on a user interface screen, thereby enabling determination of the eigen values having contribution ratios; and processing of displaying on the user interface screen a scatter diagram plotting a coordinate value of each signal in a feature space where an MDS map coordinate axis corresponding to the eigen value having the contribution ratio is selected.

To address the problem described above, still another aspect of the invention refers to semiconductor manufacturing equipment including configuration for realizing wafer process processing and preparatory processing. The semiconductor manufacturing equipment includes: a controller controlling driving and processes of various parts of the semiconductor manufacturing equipment, and a sensor monitoring each physical amount in the semiconductor manufacturing equipment or a status of each chemical response amount; a database storing equipment data obtained by sampling, at predetermined intervals, output signals of the controller and the sensor of the semiconductor manufacturing equipment being manufactured; and an arithmetic section executing: processing of searching the database for the equipment data of the semiconductor manufacturing equipment to be evaluated, reading out the equipment data to be analyzed, from a plurality of pieces of signal data to be compared, taking and squaring difference of the same signal between sampling time points, defining a sum for all the signals as distance between the time points, calculating a distance matrix and an inner product matrix based on distance relationship between the time points, calculating eigen values and eigen vectors of the inner product matrix, and calculating MDS scores based on a coordinate value matrix and a distance matrix of a feature space according to multi-dimensional scaling; processing of comparing magnitudes of the eigen values corresponding to the respective signals and arraying the magnitudes in descending order to display a list thereof on a user interface screen, thereby enabling determination of the eigen values having contribution ratios; and processing of displaying on the user interface screen a waveform graph of MDS scores corresponding to the eigen values having the contribution ratios with processing time plotted in order of vector device numbers at a horizontal axis and with values of the MDS scores plotted at a vertical axis.

The aspects of the present invention makes it easier to detect and diagnose a fault in semiconductor manufacturing equipment and processing (process) and also makes it faster to take countermeasures.

In particular, equipment data which is used for fault detection and diagnosis and which has been acquired at a short sampling interval may have any signal change and there is no need of dividing up a calculation method in accordance with whether or not there is correlation between signals, whether or not there is variation or noise, whether it is large or small, and whether signal intensity difference is large or small, which can therefore simplify operation procedures and also makes it easier to install this calculation processing into equipment and also automate the processing. Even if a signal change pattern includes a composite change such as, for example, a change having hunting and shift mixed together, the difference can be taken out in accordance with an axis (component) of a feature space after the analysis processing.

With results of the calculation processing of the invention, the fault detection can be automated and a common signal change in a plurality of signals and a particular signal change can be extracted as characteristic waveform patterns, which can therefore efficiently carry on fault investigation and diagnosis. This makes operation of countermeasures to be taken more quickly and more easily.

Further, with the results of the calculation processing of the invention, where the equipment data in the processing is as a coordinate value of the feature space, a signal can be quantified as a vector of a feature amount. With a magnitude of an eigen value (contribution) in particular, the feature amount for expressing difference between signals can be narrowed down. Therefore, time-series variation of the equipment as a result of processing can be monitored by taking one or a small number of feature amount changes for each processing in order of processing. By using this information, timing of maintenance can be determined, and it can also be further used for process controls such as a Run-to-Run control method used in a semiconductor wafer process.

BRIEF DESCRIPTION OF THE DRAWINGS

FIGS. 2A to 2D are diagrams showing examples of equipment data (signals);

FIG. 3 is a diagram showing an example of the equipment data (signals);

FIG. 10 is a diagram showing an example of a list of contribution ratios according to inter-time-point principal component analysis IT-PCA;

FIGS. 11A and 11B are diagrams showing examples of plots of principal component scores according to the inter-time-point principal component analysis IT-PCA;

FIG. 13 is a diagram showing an example of distance between signals;

FIG. 14 is a diagram showing an example of a list of contribution ratios according to an inter-signal multi-dimensional scaling IS-MDS;

FIGS. 15A and 15B are diagrams showing examples of MDS maps according to the inter-signal multi-dimensional scaling IS-MDS;

FIG. 16 is a diagram showing an example of a list of contribution ratios according to inter-time-point multi-dimensional scaling IT-MDS;

FIG. 19 is a diagram showing an example of a list of contribution ratios according to the inter-time-point principal component analysis IT-PCA;

FIG. 22 is a diagram showing an example of a list of contribution ratios according to the inter-signal multi-dimensional scaling IS-MDS;

FIG. 24 is a diagram showing an example of a list of contribution ratios according to the inter-point multi-dimensional scaling IS-MDS;

FIG. 29 is a diagram showing an example of data configuration of an equipment data DB.

DETAILED DESCRIPTION OF THE PREFERRED EMBODIMENT

Figure 1:
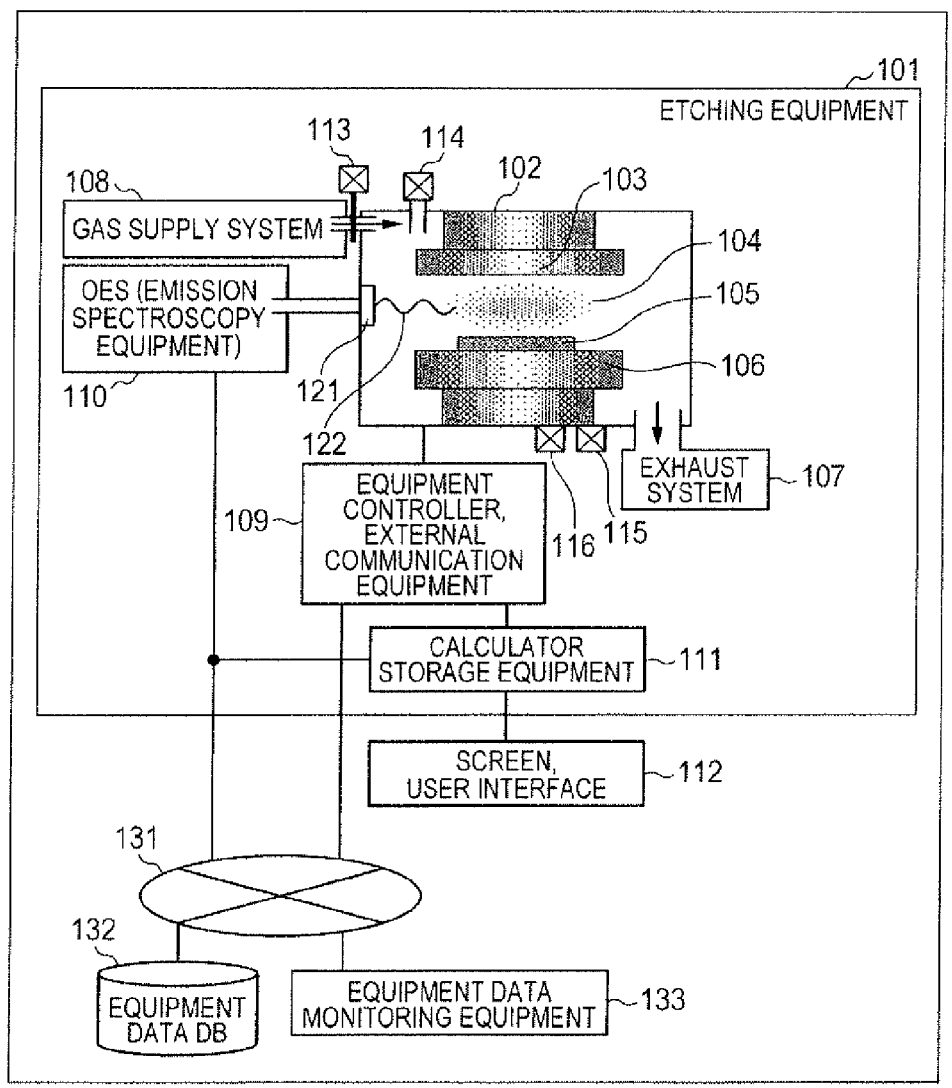
FIG. 1 is a diagram showing configuration of plasma etching equipment.

Referring to the accompanying drawings, the embodiments of the present invention will be described below.

A targeted semiconductor manufacturing equipment of the invention is configured to be capable of monitoring various equipment as components and acquiring a signal at a short sampling interval, and has to be connected to a database that stores sampled equipment data. The components of the semiconductor manufacturing equipment are partial equipment and parts that operate the equipment, but may also include an additional equipment, such as an OES, for monitoring a process status. It also includes a calculator for analyzing the acquired signal.

(1) Principal Component Analysis PCA

Difference between a plurality of signals corresponds to whether or not there is correlation, whether or not there is variation and whether it is large or small, and whether signal intensity difference is large or small. Each of them can individually be detected by an analysis method, for example, a correlation analysis such as principal component analysis, frequency analysis such as Fourier transformation, or inspection of average value difference, but in order to apply the analysis method, a waveform pattern appearing in the signal needs to be known beforehand. Of these methods, the method capable of collectively performing calculation processing on a plurality of signals to automatically detect difference is limited to the principal component analysis, but this is a method of analyzing whether or not there is correlation over a time axis between the signals, and thus cannot detect and identify variation and signal intensity difference. It can only recognize that there is no correlation between the signals.

This principal component analysis PCA is a method of identifying signal similarity by obtaining principle components (eigen values, eigen vectors) of a correlation matrix R obtained by a formula below. The correlation matrix R is obtained by the formula below.

$$s_{ij} = \frac{1}{n}(x_i - \bar{x}_i)^T(x_j - \bar{x}_j)$$ [Formula 1]

$$R = \{r_{ij}\} = \left\{\frac{s_{ij}}{\sqrt{s_{ii}}\sqrt{s_{jj}}}\right\}$$ [Formula 2]

Here, "x" is signal data. A bord body x is a vector defining that the number n of pieces of data (the number of points) of signal as the number of devices, and can also be interpreted as a matrix with an $n_{time}$-number of rows and 1-number of columns ($n_{time} \times 1$). A bar "-" on a variable means an average. Suffixes "i" and "j" mean respective signals. A suffix "T" at a right shoulder (a suffix at the right shoulder in a parenthesis of formula (1)) denotes matrix transposition. Letter "s" denotes variance and covariation, and "r" denotes a correlation coefficient.

The principal component analysis PCA is a method of analyzing covariation relationship between items and a degree (contribution) occupying an overall change of each relationship by obtaining the eigen values and the eigen vectors of the correlation matrix. Obtaining an inner product of the signal data and the eigen vector at each original time point permits obtaining a magnitude of the principal component at this time point as a principal component score.

The relationship between the eigen value, the eigen vector, and the correlation matrix is shown below.

$$\lambda_i v_i = R v_i$$ [Formula 3]

$$R = V \text{diag}(\lambda_i) V^T$$ [Formula 4]

Here, "$\lambda_i$" is the eigen value of the i-th principal component and "$v_i$" is the vector of the i-th principal component. A matrix V is a matrix having principal components vectors $v_i$ arrayed along columns. Letters "diag" is a square matrix having parameters arrayed on diagonal components and having other devices as zero. The eigen values are arrayed in descending order, and the principal component vectors are also arrayed in a corresponding manner. The principal component score Pc is obtained by a formula below.

$$Pc = XV$$ [Formula 5]

"Pc" has principal component scores arrayed in rows on an individual time point basis and has principal component scores arrayed in columns on an individual principal component basis. Letter "X" is a matrix having signal data x arrayed in columns.

Results of this principal component analysis performed on signals shown in FIG. 3 will be described. FIG. 3 shows signal data of the same four repeated processing that is continuous processing of two processing steps Step 1 311 and Step 2 312.

In the processing, signal intensity is assumed to become a set value of processing condition (recipe), but actually monitored signal intensity is shifted in a negative direction at a vertical axis for each processing over the signal 1 303, the signal 2 304, the signal 3 305, and the signal 4 306 in Step 2 312. Small variation (noise) is also included. As a result of obtaining from these signals a correlation matrix R in a range from a time point $t_0$ 321 to a time point $t_2$ 326 of Step 1 311 and Step 2 312, $r_{ij}$~1 and all devices become nearly 1. It is proved that, according to the principal component analysis PCA, all the waveforms vary in a similar manner. Moreover, as a result of obtaining the correlation matrix R only in a range of Step 1 311 or Step 2 312, $r_{ij}$=1 and $r_{ij}$~0 (i≠j), which results in nearly a unit matrix, and thus it is proved that, according to the principal component analysis PCA, waveforms are independent from one another. Even when a degree of variation varies, if an average of varying components is zero and there is independence between the signals, the correlation matrix R becomes nearly a unit matrix, providing the same results. The above proves that it is not possible to collectively detect and identify the variation and signal intensity difference of the plurality of signals.

(2) Inter-Time-Point Principal Component Analysis IT-PCA

Performing analysis through the principal component analysis PCA in order to collectively process a plurality of signals and detect and identify difference requires use of not correlation between the signals along a time axis but correlation between the signals along a different evaluation axis. Alternatively, regardless of variation or average difference, a method capable of directly performing collective processing on intensity difference between the signals and detecting and identifying difference needs to be used.

Figure 4:
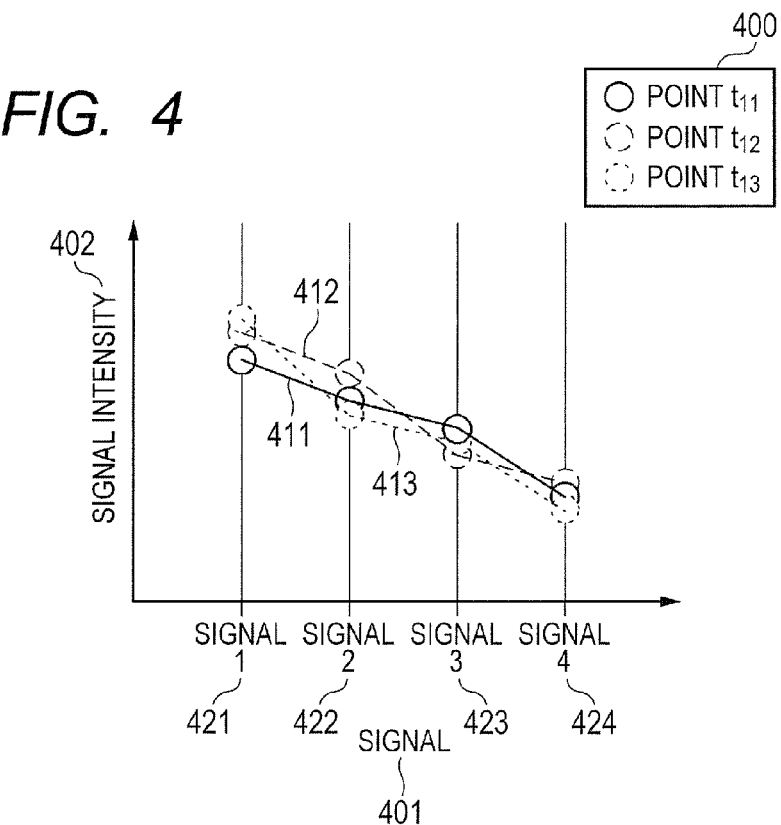
FIG. 4 is a diagram showing an example of a plurality of pieces of equipment data (signals) plotting various signals at a horizontal axis and denoting signal intensity at a vertical axis.

There is no correlation between the signals in the ranges of Step 1 311 and Step 2 312 of FIG. 3. There is signal intensity difference for each signal. Thus, FIG. 4 shows a graph plotting signals at a horizontal axis and signal intensity at a vertical axis. The plot shows the signal intensities at the time points $t_{11}$ 323, $t_{12}$ 324, and $t_{13}$ 325 in FIG. 3. As a result of linking together the signal intensities at the different time points over the signals with lines, the time points $t_{11}$, $t_{12}$, and $t_{13}$ turn to broken lines 411, 412, and 413, respectively. As described above, there is correlation in signal intensity between the time points. There is negative correlation along the signal 1 421, the signal 2 422, the signal 3 423, and the signal 4 424. Focusing on the range of Step 1 311 of FIG. 3, the signal intensities increase in ascending order, that is, order of the signal 1 303, the signal 2 304, the signal 3 305, and the signal 4 306, and thus there is again correlation in signal intensity between the time points. Obtaining correlation between the time points as described above permits obtaining correlation in signal intensity difference.

Even if a specific signal has hunting as shown in FIG. 2B, there is signal intensity difference between the signals at the time point where the hunting occurs and thus there is provided correlation in signal intensity between the time points. The plurality of signals having no correlation between the time points refer to a case where the plurality of signals match each other or a case where for the plurality of signals, differences from an average at the different time points vary evenly in positive and negative directions and a sum of products between the time points is cancelled out, turning into zero.

Calculation for obtaining the correlation matrix R between the time points may be performed by using formulae 1 and 2. At this point, "x" is signal data at each time point, and a bold body "x" is a vector defining the number $n_{signal}$ of signals being as the number of devices. Moreover, suffixes "i" and "j" mean the respective time points. A case where there is no correlation between the time points for the plurality of signals corresponds to that a result of formula 1 is zero.

A the plurality of signals and a change only present in the specific signal appear, and these changes appear in the principal signal vectors in order in arranging a principal component score Pc in a feature space where a principal component is an axis enables detection and identification of difference between signals. The plurality of signals having similar intensity changes are arranged at positions close to each other, and the signals having great intensity change difference are arranged at positions distant from each other. Moreover, a characteristic signal appears in the principal component vector. For example, a change common to the plurality of signals and a change only present in the specific signal appear, and these changes appear in the principal component vectors in order in accordance with scales (contributions) of the eigen values of the principal components.

The principal component analysis PCA using this correlation matrix between the time points is called inter-time-point principal component analysis IT-PCA. A calculation method itself of the principal component analysis PCA is identical for the formulae 3 to 5. For one signal, a principal component score of the number $n_{time}$ of time points is obtained. In a space where the principal component scores are arranged, difference between the signals can be detected and identified.

(3) Multi-Dimensional Scaling MDS

To directly performing collective processing on the intensity difference between the signals and detect and identify the difference, if dissimilarity or distance between the signals can be defined, relationship between the signals provided by the multi-dimensional scaling MDS can be arranged in a space according to a feature amount to detect and identify the difference.

The multi-dimensional scaling MDS is a method of obtaining a sample coordinate value from data of the distance between samples arranged in the space. Now assume that $n_{sample}$-number of samples are arranged in an $n_{dimension}$-dimensional space. If distance between the samples is defined by Euclidian distance, the distance between the samples is provided by formula below.

$$d_{ij} = \sqrt{\sum_{k}^{n_{dimension}} (x_{ik} - x_{jk})^2}$$ [Formula 6]

Here, "i" and "j" are indexes of the samples, and "k" is an index of the dimension. A distance matrix T of $n_{sample} \times n_{sample}$ is provided by formula below.

$$T = \{d_{ij}^2\}$$ [Formula 7]

Note that the distance matrix T is also called a dissimilarity matrix.

Using a centralization matrix Gn, an inner product matrix Bc is obtained.

$$G_n = I_n - \frac{1}{2} 1_n 1_n^T$$ [Formula 8]

$$= \begin{bmatrix} 1-\frac{1}{n} & -\frac{1}{n} & \cdots & -\frac{1}{n} \\ -\frac{1}{n} & 1-\frac{1}{n} & \cdots & -\frac{1}{n} \\ \vdots & \vdots & \ddots & -\frac{1}{n} \\ -\frac{1}{n} & -\frac{1}{n} & -\frac{1}{n} & 1-\frac{1}{n} \end{bmatrix}$$

$$Bc = -\frac{1}{2} G_n T G_n^T$$ [Formula 9]

Here, "In" is a unit matrix of n×n. "1n" is a vector of the number n of devices all of which are 1. Since the number of samples is $n_{sample}$, $n = n_{sample}$.

The inner product matrix Bc is subjected to eigen vector decomposition.

$$Bc = V \text{diag}(\lambda_i) V^T = V \Lambda V^T$$ [Formula 10]

Symbol "Λ" (upper case lambda in Greek character) is a matrix of $n_{sample} \times n_{sample}$ where a diagonal device is an eigen value and the other devices are zero, and "V" is a matrix of $n_{sample} \times n_{sample}$ where eigen vectors are arrayed in columns. There is relationship $Bc = Xc Xc^T$ between the inner product matrix Bc and a matrix Xc of coordinate values of samples in the $n_{dimension}$-dimensional space. Therefore, the matrix Xc of the coordinate values is provided by formula below.

$$\{xc_{ij}\} = Xc = V \Lambda^{1/2} = V \text{diag}(\sqrt{\lambda_i})$$ [Formula 11]

In case of a sample in a two-dimensional space, the first and second columns of the matrix Xc become coordinate values of a first axis and a second axis. That is, an index "i" of the coordinate value $xc_{ij}$ in formula 11 means a sample and "j" means an axis of a feature space as a map of the multi-dimensional scaling MDS. "Xc" is called an MDS map. A coordinate value of the MDS map is calculated the number of times corresponding to $n_{sample}$.

(4) Inter-Signal Multi-Dimensional Scaling IS-MDS

By using intensity difference of a plurality of signals, distance between the signals is defined for the purpose of detecting and identifying difference. Over each time point, the distance can be defined by a sum of squares of signal intensity difference. That is, "i" and "j" in formula 6 are defined as indexes for the signal and "k" is defined as an index for the time point. $N_{dimension} = n_{time}$, and $n_{sample} = n_{signal}$. As a result of performing analysis by the multi-dimensional scaling MDS based on the definition of this distance, difference between the signals is expressed by the coordinate value of the feature space calculated by formula 11. The multi-dimensional scaling MDS analyzing the signal based on the definition of this distance is called inter-signal multi-dimensional scaling IS-MDS.

(5) Inter-Time-Point Multi-Dimensional Scaling IT-MDS

Figure 5:
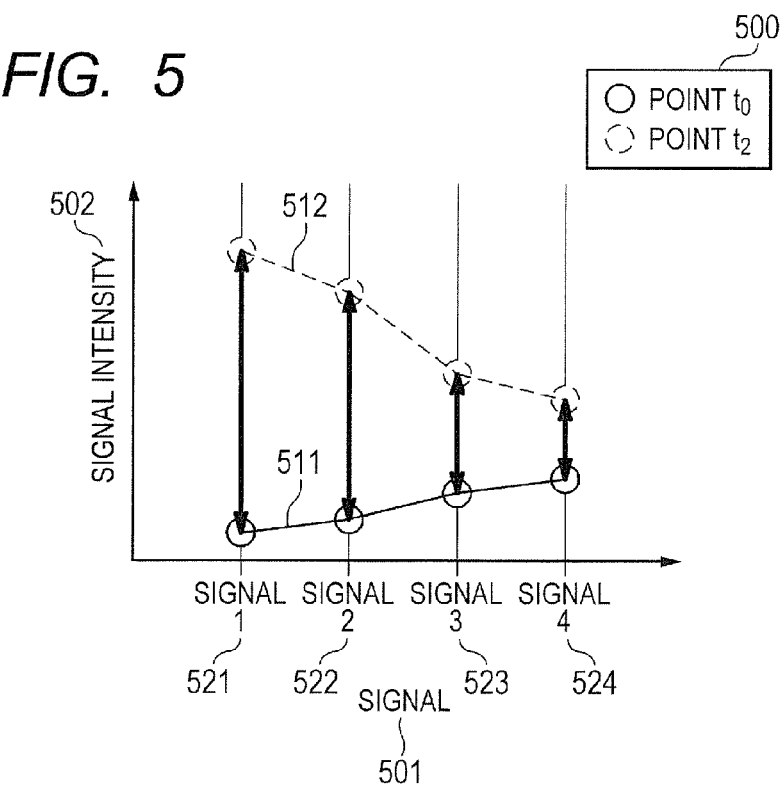
FIG. 5 is a diagram illustrating that signal intensity difference between time points is defined as distance in the example of the plurality of pieces of equipment data (signals)

For the definition of the distance, focusing on signal intensity difference between the time points in a same manner as the inter-time-point principal component analysis IT-PCA, the signal intensity difference between the time points can also be defined as the distance. That is, difference of the same signal between the time points is taken and squared to define distance between the time points as a sum for all the signals. FIG. 5 shows a graph of the signals of FIG. 3 with signal intensities at the time point $t_0$ 321 and $t_2$ 326. Difference between two arrows in FIG. 5 is taken and squared to define distance between the time points as a sum for all the signals. In formula 6, "i" and "j" are defined as indexes for the time points and "k" is defined as an index for the signal. $N_{dimension} = n_{signal}$, and nsmaple=$n_{time}$. As a result of performing analysis by the multi-dimensional scaling based on the definition of this distance, the coordinate value of the feature space calculated by formula 11 becomes a waveform of a characteristic signal included in the signal. That is, graphing data values of the respective columns as waveforms with a row of the coordinate value matrix Xc plotted at a horizontal axis and the data values (device values of the matrix) plotted at a vertical axis shows a graph of characteristic signals. To express the waveform of this signal while reflecting a degree of actual difference between the signals, the coordinate value matrix Xc is multiplied by the distance matrix X. This is called a multi-dimensional scaling MDS score in this specification. The MDS score MDSscore is a matrix of $n_{time} \times n_{time}$.

This results in an MDS score $mdsscore_i$ for the number $n_{time}$ of devices corresponding to the i-th coordinate axis for each column.

$$MDSscore = TXc \quad \text{[Formula 12]}$$

Multi-dimensional scaling MDS analyzing a signal based on definition of distance provided by signal intensity difference between the time points is called inter-time-point multi-dimensional scaling IT-MDS.

With the method described above, even if there is no correlation between the signals over processing time, as long as there is difference such as whether or not there is variation, whether the variation is large or small, and whether the signal intensity difference is large or small, it is possible to collectively calculate the plurality of signals and detect and identify difference between the signals in the feature space. There is also no need of previously preparing a signal change pattern.

(6) Configuration Example of Semiconductor Manufacturing Equipment

Figure 6:
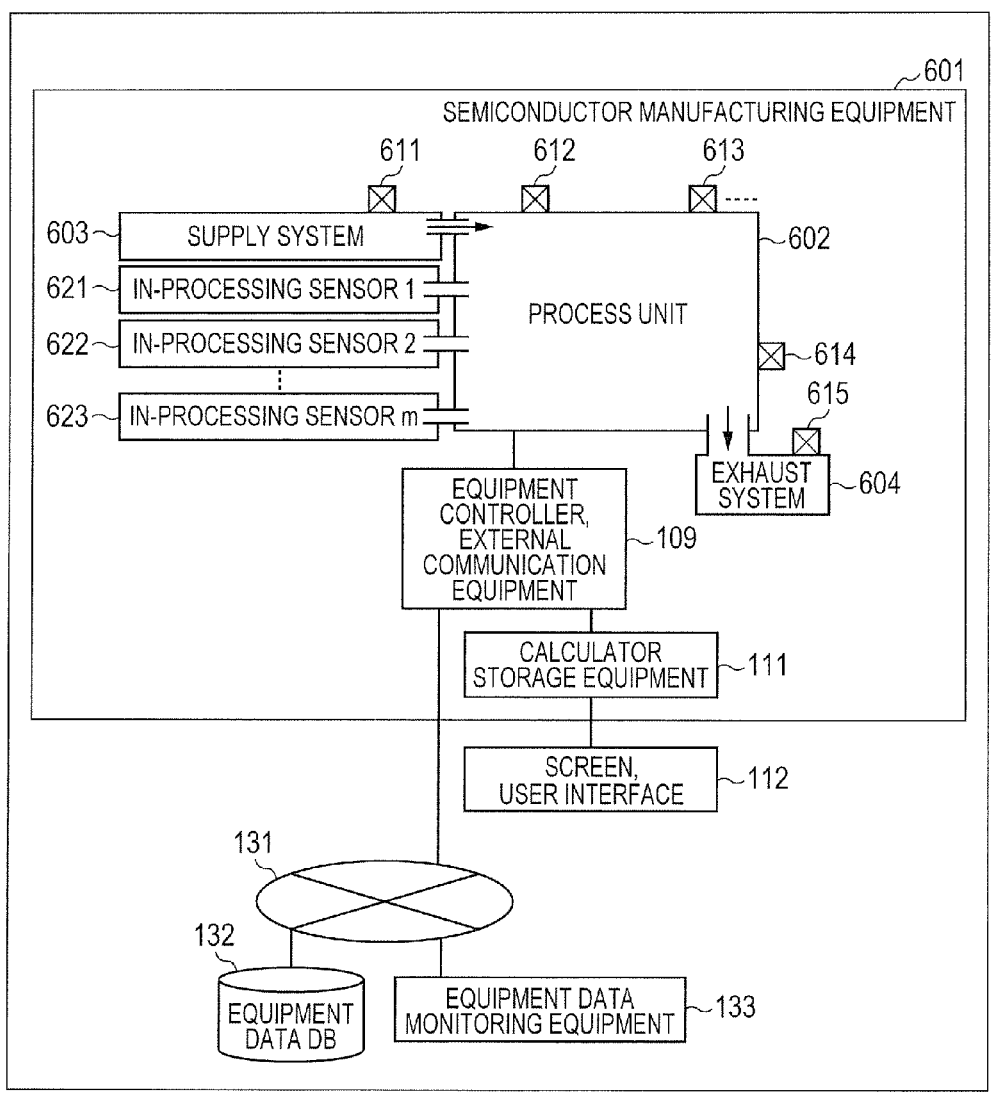
FIG. 6 is a diagram showing an example of configuration of semiconductor manufacturing equipment.
Figure 7:
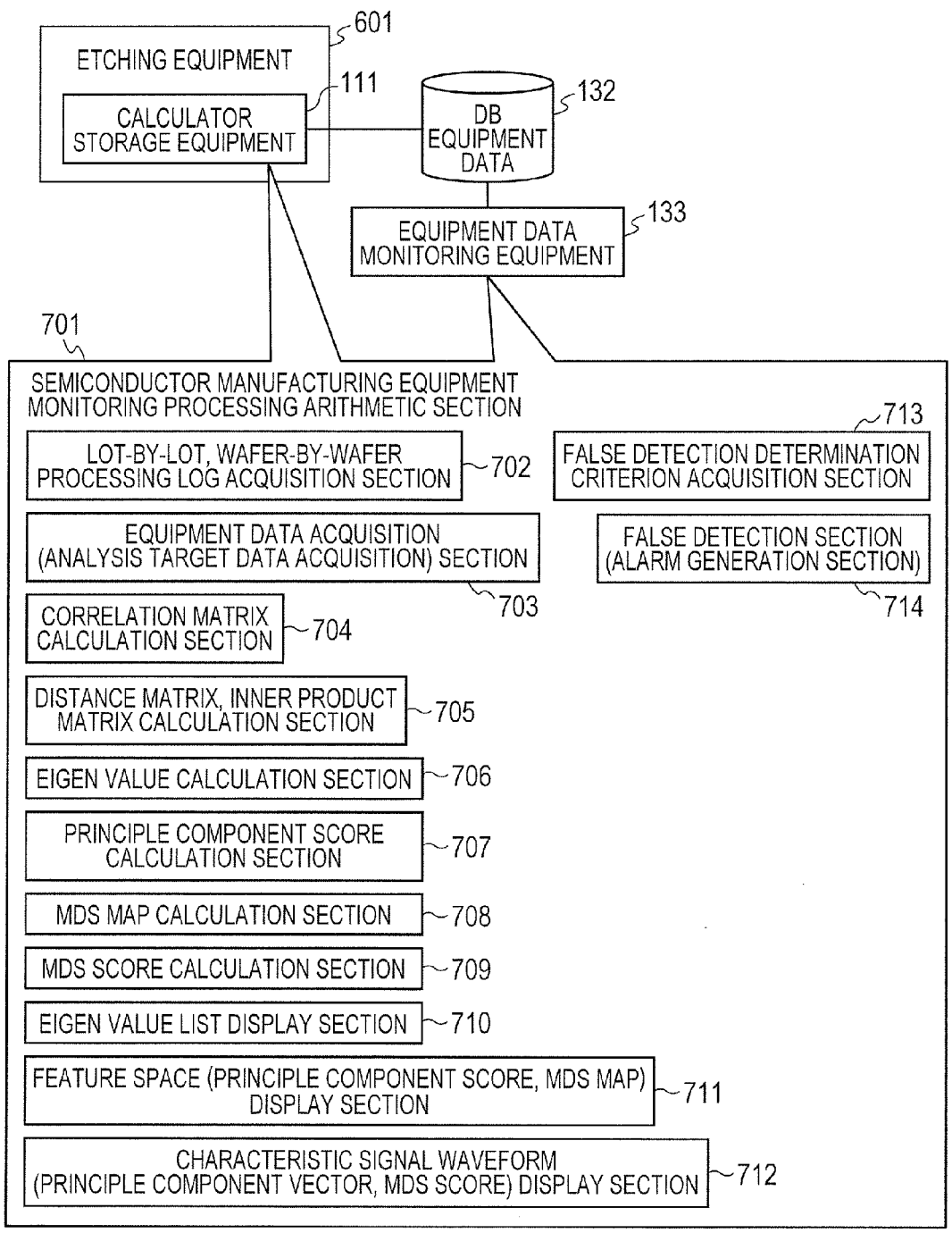
FIG. 7 is a diagram showing an example of system configuration of semiconductor manufacturing equipment monitoring processing in the semiconductor manufacturing equipment.

Referring to FIGS. 6 and 7, the configuration and operation of the semiconductor manufacturing equipment according to one embodiment of the invention will be described. FIG. 6 is a configuration diagram showing the configuration example of the semiconductor manufacturing equipment according to one embodiment of the invention, and FIG. 7 is a configuration diagram showing functional configuration of semiconductor manufacturing equipment monitoring processing arithmetic section executed in the calculator 111 provided in the semiconductor manufacturing equipment 601 according to one embodiment of the invention or executed in an equipment data monitoring equipment 133 connected via the network 131.

As shown in FIG. 6, the semiconductor manufacturing equipment 601 includes: a process section 602, a supply system 603 for a material for process processing, an exhaust system 604 for a waste material after processing, an equipment controller-outside communication equipment 109, calculator-storage equipment 111 as a calculator system, a screen-user interface 112 as a terminal, equipment controllers 1 611 to n 615 for operating and changing various portions of the equipment for realizing predetermined processing; and in-processing sensors 621 to m 623 for detecting a status of process processing.

The process section 602 is the chamber 102 in the example of the etching equipment 101 shown in FIG. 1. For plasma CVD equipment depositing a thin film and PVD (Physical Vapor Deposition) equipment, a process section is also called a chamber. In thermal oxidation equipment and LPCVD equipment, a plurality of wafers are filled in a boat to perform processing, and this process section is called furnace. In cleaning equipment and plating equipment, a chemical solution in particular is put in a wafer, and thus the process section serves as a bath. A CMP equipment has a wafer with a polishing head, and presses it against a pad on a rotary fixed disc and makes rotary movement to thereby perform polishing. A portion forming the equipment for this polishing is the process section. The portion directly performing wafer process processing is the process section.

The supply system 603 and the exhaust system 604 are the gas supply system 108 and the exhaust system 107 in the example shown in FIG. 1. A different kind of equipment is also configured to supply a material for realizing the process processing and exhaust the material after the processing.

The equipment controllers 1 611 to n 615 correspond to the flow rate adjustment equipment 113, the pressure adjustment equipment 114, the power adjustment equipment 115, and the temperature adjustment equipment 116 in the example shown in FIG. 1. A different kind of equipment also includes equipment for operating the equipment and adjusting a process. The semiconductor manufacturing equipment also includes a structure for transferring a wafer to the process section, and a controller for operating this transfer equipment may also be treated as an equipment controller.

The in-processing sensors 1 621 to m 623 are the OES (Optical Emission Spectrometry) in the example shown in FIG. 1.

Output of the equipment controllers 611 to 615 and the in-processing sensors 621 to 623 are inputted to the calculator-storage equipment 111 via the equipment controller-outside communication equipment 109 (not shown). Moreover, in a case where the equipment data monitoring equipment 133 totally monitoring a plurality of semiconductor manufacturing equipment installed in a manufacturing line is installed, the equipment controller-outside communication equipment 109 transmits output of the equipment controllers 611 to 615 and the in-processing sensors 621 to 623 to the equipment data monitoring equipment 133 via the network 131. It is recorded into the equipment data DB 132 by the equipment data monitoring equipment 133.

The semiconductor manufacturing equipment 601 is connected to the equipment data DB 132 via the network 131, and also for the convenience of data sharing, the equipment data monitoring equipment 133 as the calculator system is also connected to the network 131.

The calculator-storage equipment 111, in manufacturing processing, acquires the output of the equipment controllers and the in-processing sensors, records it as equipment data into the equipment data DB 132 via the equipment controller-outside communication equipment 109, and in processing of monitoring the semiconductor manufacturing equipment, reads out the corresponding equipment data from the equipment data DB 132 via the equipment controller-outside communication equipment 109 and performs analysis to thereby execute the equipment monitoring processing. Moreover, the calculator-storage equipment 111 is connected to the screen-user interface 112 and displays for the user information such as a status of equipment monitoring and a fault occurrence alarm, principal component scores as analysis results, a graph of the MDS map, a graph of a signal waveform, and a list of eigen values (contributions). Of the processing, the equipment monitoring processing of reading out the corresponding equipment data from the equipment data DB 132 and performing analysis may be performed by the equipment data monitoring equipment 133 connected via the network 131. Alternatively, function of the equipment data monitoring equipment 133 may be as software executed by the calculator-storage equipment 111 of the semiconductor manufacturing equipment 601 and the equipment data DB 132 may be included in the calculator-storage equipment 111 to be included in the semiconductor manufacturing equipment 601, in which case a monitoring processing system can monitor the equipment without connecting the semiconductor manufacturing equipment 601 to the network.

(7) Functional Configuration of Semiconductor Manufacturing Equipment Monitoring Processing Arithmetic Section A semiconductor manufacturing equipment monitoring processing arithmetic section 701 executed in the calculator-storage equipment 111 has: a lot-by-lot and wafer-by-wafer processing log acquisition section 702, an equipment data (analysis target data) acquisition section 703, a correlation matrix calculation section 704, a distance matrix and inner product matrix calculation section 705, an eigen value calculation section 706, a principal component score calculation section 707, an MDS map calculation section 708, an MDS score calculation section 709, an eigen value list display section 710, a feature space (principal component score, MDS map) display section 711, a characteristic signal waveform (principal component vector, MDS score) display section 712, a fault detection determination criterion acquisition section 713, and a fault detection section (alarm generation section) 714.

The lot-by-lot and wafer-by-wafer processing log acquisition section 702 acquires output signals from the equipment controllers 611 to 615 and the in-processing sensors 621 to 623 in a predetermined sampling cycle, and stores equipment data thereof into the equipment data DB 132.

(8) Data Configuration of Equipment Data DB 132

FIG. 29 shows a data configuration example of the equipment data DB 132. In a case where the equipment data DB 132 is connected to the network to form it as a common database storing equipment data of a plurality of semiconductor manufacturing equipment, as a directory for classifying the equipment data to be stored, a semiconductor manufacturing equipment ID 2901 is included. Further, the equipment data is classified by a directory composed of data record of the lot or wafer ID 2902 processed in this semiconductor manufacturing equipment, a manufacturing station ID 2903, a manufacturing recipe ID 2904, and manufacturing date and time 2905. Then in this semiconductor manufacturing equipment, while manufacturing process of this lot or wafer is carried out, the equipment data is stored in a predetermined sampling cycle for each signal. The equipment data is stored in a data record format composed of data items including a signal ID 2906, observation starting date and time 2907, observation ending date and time 2908, a sampling interval 2909, and time-series equipment data 2910. For example, for signal data whose signal ID is sig-1, signal intensity data acquired by sampling started at the observation starting date and time: October 18, 09:20 minutes 10 seconds 00 and ending at the observation ending date and time: October 18, 09:26 minutes 25 seconds 50 at sampling intervals of 0.50 seconds is stored into a column for the time-series equipment data.

In a case where the equipment monitoring processing is not executed by the equipment data monitoring equipment on the network with the semiconductor manufacturing equipment 601 being connected to the network 131, the aforementioned equipment data DB 132 is included in the calculator-storage equipment 111.

(9) Outline of Monitoring Processing of Semiconductor Manufacturing Equipment 601

The monitoring processing of the semiconductor manufacturing equipment 601 searches, for example, a history of a plurality of times of manufacturing processing in the same station and with the same recipe to acquire a real value of this equipment data and performs analysis to thereby monitor a status of the semiconductor manufacturing equipment and detects a fault. This processing is assumed to be performed by the calculator-storage equipment 111 in some cases and by the equipment data monitoring equipment 133 on the network in some cases.

First, the equipment data to be analyzed is specified, and the equipment data is acquired from the equipment data DB 132 by the equipment data acquisition (analysis target data acquisition) section 703.

Targeted on the acquired equipment data, analysis processing is performed by the inter-time-point principal component analysis IT-PCA, the inter-signal multi-dimensional scaling IS-MDS, or the inter-time-point multi-dimensional scaling IT-MDS.

In the inter-time-point principal component analysis IT-PCA, a correlation matrix between time points is first calculated in the correlation matrix calculation section 704. Then eigen values and eigen vectors are calculated in the eigen value calculation section 706, and principal component scores are calculated in the principal component score calculation section 707. Magnitudes of the eigen values (contribution ratios) are compared to be displayed in the eigen value list display section 710. This makes it possible to judge based on the magnitude of the eigen values whether there is a common change pattern or a unique change pattern in the signal. A criterion for determining that the signal is faulty is acquired through user input in the fault detection determination criterion acquisition section 713. This criterion is a threshold for a degree of difference in principal component score between the signals (distance in a feature space where the principal component scores are arranged). It is determined upon excess over the threshold that there is a fault. When as a result of the fault determination performed by the fault detection section (alarm generation section) 714, it has been determined that a fault has occurred, the screen-user interface 112 displays an alarm. For results of calculation processing, a graph of principal component scores is displayed at the screen-user interface 112 in the feature space (principle component score, MSD map) display section 711, and the principle component vectors are displayed in a graph at the characteristic signal waveform (principle component vector, MDS score) display section 712 with processing time plotted in order of vector device numbers at a horizontal axis and with the vector values plotted at a vertical axis. Moreover, a list of eigen values is displayed. This permits the user to confirm difference between the generated signal and the past signal and characteristics of the waveform. In these outputs to the user, information may be notified to outside via the network, and any of various modes of output such as an e-mail and voice processing can be adopted.

In the inter-signal multi-dimensional scaling IS-MDS, distance between the waveforms is calculated in the distance matrix and inner product matrix calculation section 705 to obtain an inner product matrix. Eigen values and eigen vectors of the inner product matrix are obtained in the eigen value calculation section 706, and a coordinate value of the MDS map is obtained in the MDS map calculation section 708. The criterion for determining fault occurrence is acquired in the fault detection determination criterion acquisition section 713, fault determination is made in the fault detection section (alarm generation section) 714, and an alarm is outputted. A graph of the MDS map is displayed at the screen-user interface 112 in the feature space (principal component score, MDS map) display section 711. A list of eigen values (contribution ratios) is also displayed in the eigen value list display section 710.

In the inter-time-point multi-dimensional scaling IT-MDS, distance between the times points is calculated in the distance matrix and inner product matrix calculation section 705 to obtain an inner product matrix. Eigen values and eigen vectors of the inner product matrix are obtained in the eigen value calculation section 706, and a coordinate value matrix Xc of the MDS map is obtained in the MDS map calculation section 708. An MDS score is obtained based on the coordinate value matrix Xc and the distance matrix T in the MDS score calculation section 709. The MDS score is a characteristic signal waveform pattern with respect to the processing time. A graph of the MDS scores with respect to the processing time is displayed at the screen-user interface 112 in the characteristic signal waveform (principal component vector, MDS score)

display section 712. A list of eigen values (contribution ratios) is displayed in the eigen value list display section 710.

With the above system configuration, signal difference can be analyzed based on the plurality of pieces of equipment data to automatically detect a fault, and displaying results of the analysis permits the user to precede diagnosis and measures.

First Embodiment

Figure 8:
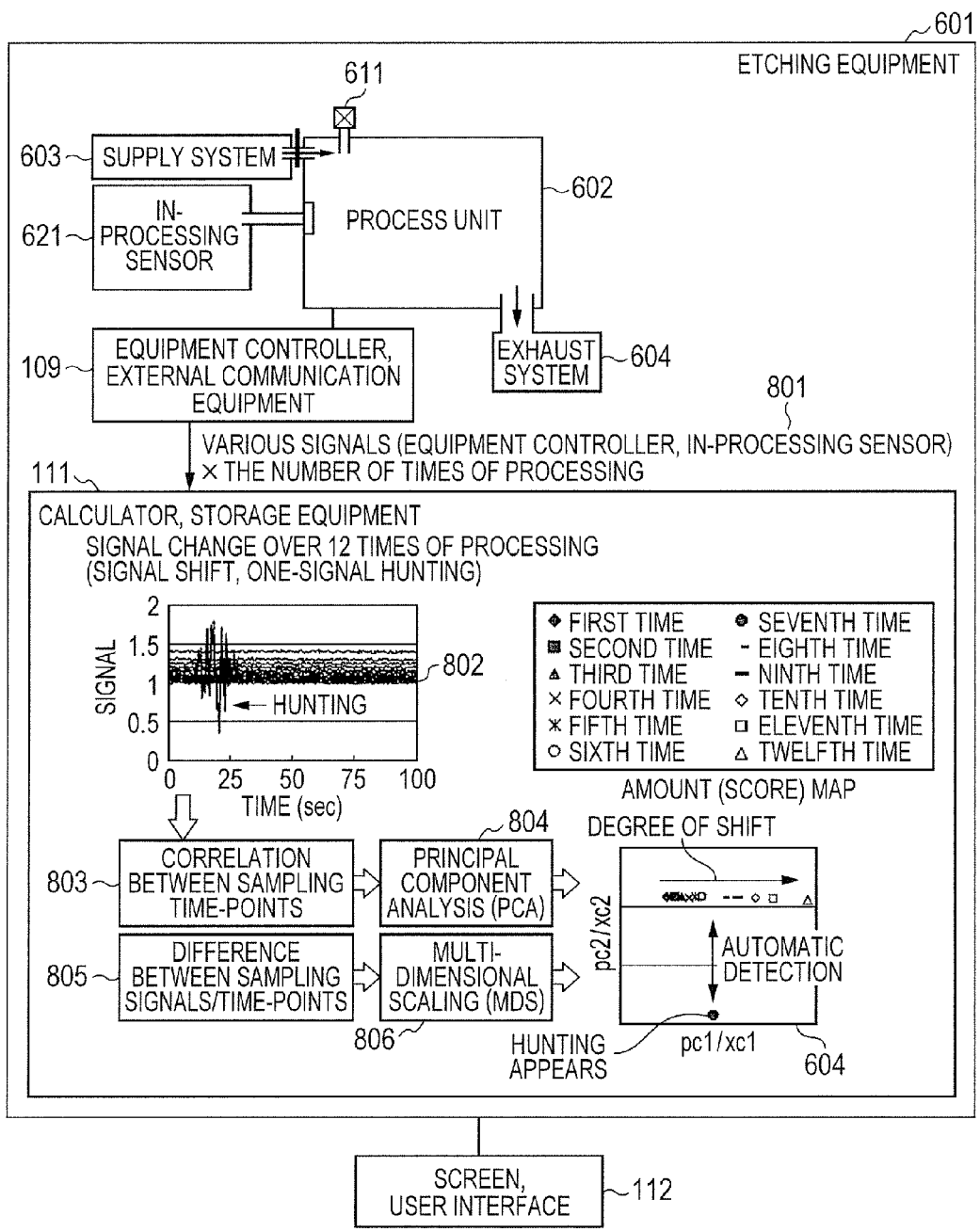
FIG. 8 is a diagram showing an outline of semiconductor manufacturing equipment monitoring method.

An outline of a semiconductor manufacturing equipment monitoring method according to the invention in the semiconductor manufacturing equipment will be described, referring to FIG. 8.

Configuration of the semiconductor manufacturing equipment 601 is the same as that shown in FIG. 6. The equipment monitoring processing is executed by the calculator-storage device 111 of the equipment in this embodiment.

In the semiconductor manufacturing equipment 601, wafer processing is carried out a plurality of times, and output signals of each equipment controller 611 and each in-processing sensor 621 are inputted into the calculator-storage device 111 via the equipment controller-outside communication equipment 109 and stored into the device data DB 132. The calculator-storage device 111 acquires from the device data DB 132 various signals as the stored equipment data for the number of times of processing, that is, data obtained by various signals×the number of times of processing 801, and analysis processing is executed. In this embodiment, for example, a signal for 12 times of processing performed in the etching device is targeted. A signal change is shown in a graph 802. Signal intensity is shifted through the 12 times of processing, and hunting occurs at one of the signals at the seventh time. Calculating correlation 803 of these signals between sampling time points and executing the principal component analysis PCA 804 provides a feature amount (score) map 807. Moreover, calculating difference between sampling signals and difference 805 between the time points and executing multi-dimensional scaling MDS 806 also provides the feature amount (score) map 807. In the feature amount (score) map 807, for each signal, changes in a degree of shift are arrayed in a direction along pc1/xc1 axes in accordance with the degree, and the signals with hunting in a direction along pc2/xc2 axes are separated. The above processing can automatically be executed by the calculator, and taking difference between these feature amounts permits automatic detection of the difference, such as a fault, between the signals. Moreover, data of characteristic signal change can be obtained over the processing time based on the principal component vectors in case of the principal component analysis PCA 804 and based on the feature amount (MDS score) in case of the multi-dimensional scaling MDS 806. Displaying results of these calculations in a graph on the screen-user interface 112 permits the user to confirm the presence and absence of a fault and signal change characteristics.

Figure 9:
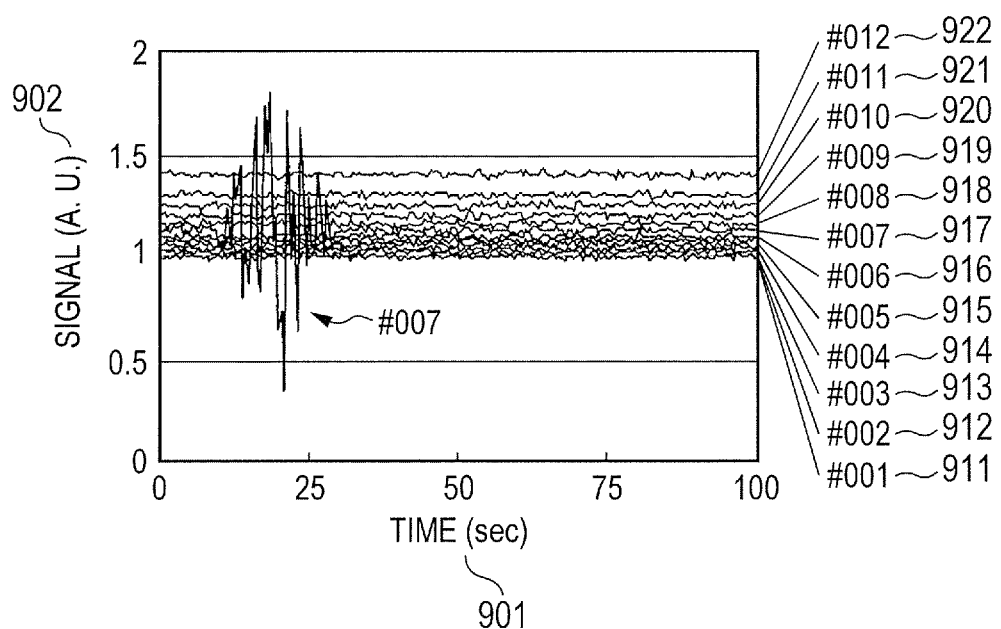
FIG. 9 is a diagram showing an example of signals.
Figure 12A:
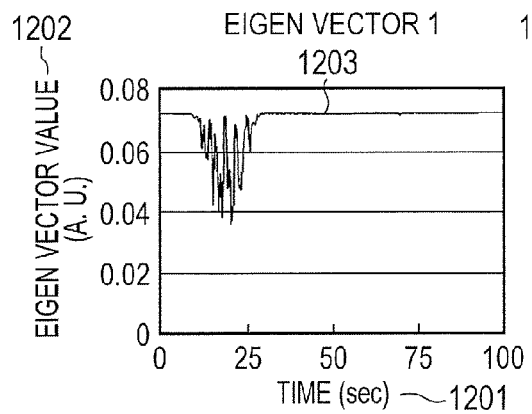
FIGS. 12A to 12D are diagrams showing examples of principal component vector values with respect to time according to the inter-time-point principal component analysis IT-PCA.
Figure 12B:
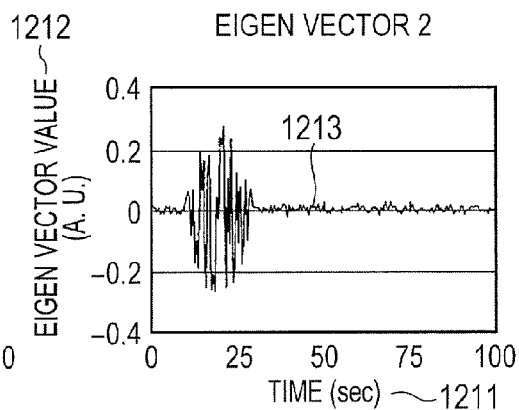
Figure 12C:
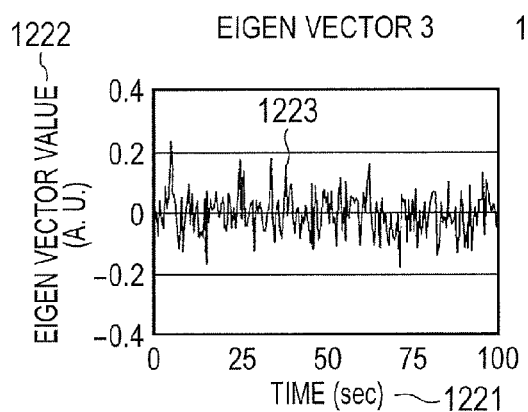
Figure 12D:
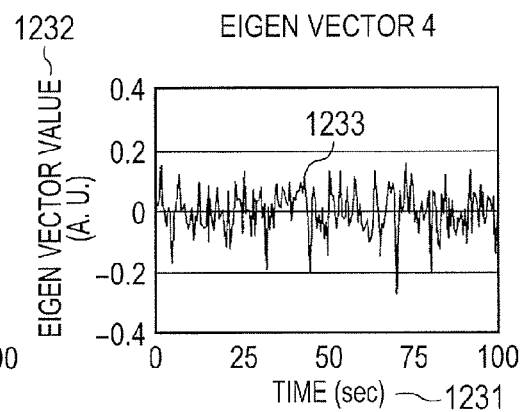

A method of arranging in a feature space each signal of the signals subjected to the 12 times of processing shown in FIG. 9 and extracting a characteristic waveform pattern included in the signal is shown below. A unit system A. U. of a signal (A.U.) 902 at a vertical axis of the graph means an arbitrary unit. In FIG. 9, the signal intensity shifts from the signal #001 911 to #012 922 on an individual process processing basis, and hunting appears in the signal #007 917.

First, a method according to the inter-time-point principal component analysis IT-PCA will be shown. The correlation matrix calculation section 704 calculates a correlation matrix R of the signals between the time points. For the signal data, defining as $X_{tmp}$ a matrix which has the signals in rows and the time points in columns and in which an average vertical vector between the columns is subtracted for each column, $$R = X_{tmp}{}^T X_{tmp}/n_{signal} \qquad \text{[Formula 13]}$$

the correlation matrix is calculated by formula above. Then the eigen value calculation section 706 calculates an eigen value $\lambda_i$ and an eigen vector $v_i$, and the principal component score calculation section 707 calculates a principal component score $pc_i$. Letter "i" is any of integers from 1 to $n_{time}$, the eigen vector $v_i$ is a vector of the number $n_{time}$ of devices, and "$pc_i$" is a vector of the number $n_{signal}$ of devices. Order of the devices of $pc_i$ corresponds to signals of the rows of the signal data.

FIG. 10 shows a table of the eigen values, that is, contribution ratios 1002 displayed by the eigen value list display section 710 in descending order. CCR1003 is a cumulative contribution ratio. According to this, the contribution of the first principal component occupies 95% which is a majority portion, the second principal component occupies 5%, and those thereafter have no contribution. $N_{time}$-number of eigen values and eigen vectors are calculated.

FIGS. 11A and 11B show plots of principal component scores of signals in the feature space provided by the feature space (principal component score, MDS map) display section 711. FIG. 11A is a scatter diagram for the first principal component (pc1) and the second principal component (pc2), and FIG. 11B is a scatter diagram for the third principal component (pc3) and the fourth principal component (pc4). This proves that signal intensity change is expressed by pc1 1101 and that difference provided by the hunting of the signal #007 is expressed by pc2 1102. In FIG. 11B, based on the fact that only the signals vary and the contribution ratio of the eigen value information is 0%, it is proved that these principal components are meaningless. Therefore, the values of the first principal component and the second principal component are compared between the signals, and if it has been determined that there is difference therebetween, whether or not a fault has occurred can be judged automatically.

FIGS. 12A to 12D show principal component vectors as characteristic signal waveforms calculated by the characteristic signal waveform (principal component vector, MDS score) display section 712 over the processing time. The eigen vector 1 of FIG. 12A proves that an average value is approximately 0.07, that is, there is difference in signal intensity between the signals. Moreover, the eigen vector 2 of FIG. 12B proves that hunting included in the signal #007 is obtained as the characteristic signal waveform. The principal component vectors of FIGS. 12C and 12D vary randomly and the contribution ratio of the eigen value information is 0%, and thus these principal components are meaningless.

Next, a method according to the inter-signal multi-dimensional scaling IS-MDS will be shown. The distance matrix and inner product matrix calculation section 705, based on the signal intensity difference between the signals on an individual time point basis, calculates the distance matrix T of formula 7. After calculation of the inner product matrix Bc through calculations by the formulae 8 to 10, the eigen value calculation section 706 calculates the eigen value $\lambda i$ and the eigen vector $vi$. The MDS map calculation section 708 calculates a coordinate value $xc_i$ of each signal in the MDS map as the feature space through the calculation by formula 11. Letter "i" is any of integers from 1 to $n_{signal}$, and an eigen vector $v_i$ is a vector of the number $n_{signal}$ of devices. A sequence of i corresponds to a sequence of the signal corresponding to the row and column of the distance matrix T. Note that $n_{signal}$-number of eigen values and eigen vectors are calculated.

FIG. 13 shows the calculated distance matrix T. A diagonal component is zero. Moreover, the distance both in the first row and the first column increases from the signal #001 to the signal #012 for each repeated processing, but the distance increases in the signal #007, proving that there is an influence by the hunting.

FIG. 14 shows a list of eigen values calculated by the inter-signal multi-dimensional scaling IS-MDS. Contribution of the first principal component occupies 90%, which is a majority portion, the second principal component occupies 10%, and those thereafter occupies 0%, having no contribution.

FIGS. 15A and 15B show plots of the signals in the MDS map as the feature space calculated by the MDS map calculation section 708 and the feature space (principal component score, MDS map) display section 711. FIG. 15A is the plot for a first axis xc1 and a second axis xc2, which proves that the first axis xc1 1501 expresses signal intensity difference and the second axis xc2 1502 expresses difference provided by the hunting of the signal #007. FIG. 15B is the plot for a third axis xc3 and a fourth axis xc4, and based on the fact that the contribution of the eigen value information is 0%, it is proved that these axes are meaningless.

A method according to the inter-time-point multi-dimensional scaling IT-MDS will be shown. This method is a method for extracting a characteristic signal waveform in a signal. The distance matrix and inner product matrix calculation section 705 takes difference between the time points in each signal, and calculates the distance matrix T of formula 7. As is the case with the inter-signal multi-dimensional scaling IS-MDS, the inner product matrix Bc is calculated, and the eigen value calculation section 706 calculates an eigen value $\lambda_i$ and an eigen vector $v_i$. Letter "i" is any of integers from 1 to $n_{time}$, and the eigen vector $v_i$ is a vector of the number $n_{time}$ of devices. A sequence of "i" corresponds to a row and a column of the distance matrix T, that is, an array over the processing time. Then the MDS score calculation section 709 obtains an MDS score $mdsscore_i$ by formula 12. The $mdsscore_i$ is a vector taken from the i-th column of the MDSscore.

FIG. 16 shows a list of eigen values displayed at the screen-user interface 112 by the eigen value list display section 710. Contribution of the first eigen value occupies 95%, which is a majority portion. Looking at cumulative contribution ratios CRR 1603, those up to the tenth eigen value have contribution with an accuracy of two decimal points, and those thereafter have a contribution ratio of 0%. Note that $N_{time}$-number of eigen values and eigen vectors are calculated.

Figure 17A:
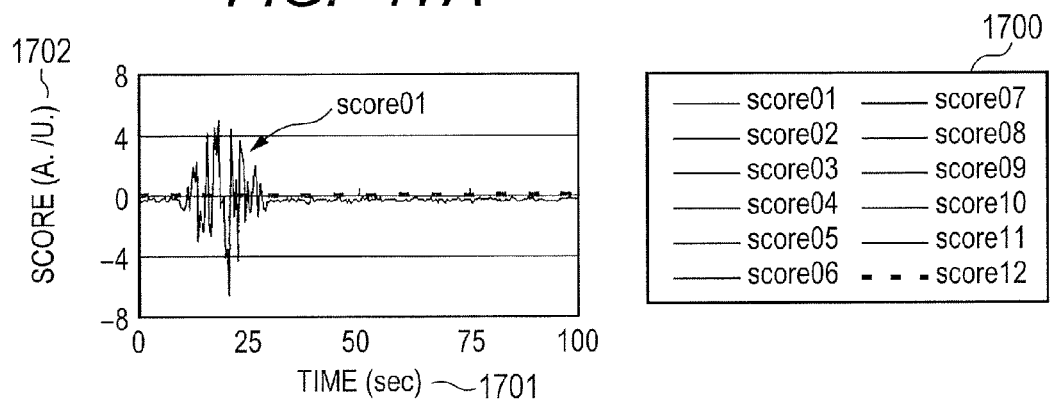
FIGS. 17A and 17B are diagrams showing examples of MDS scores with respect to time according to the inter-time-point multi-dimensional scaling IT-MDS.
Figure 17B:
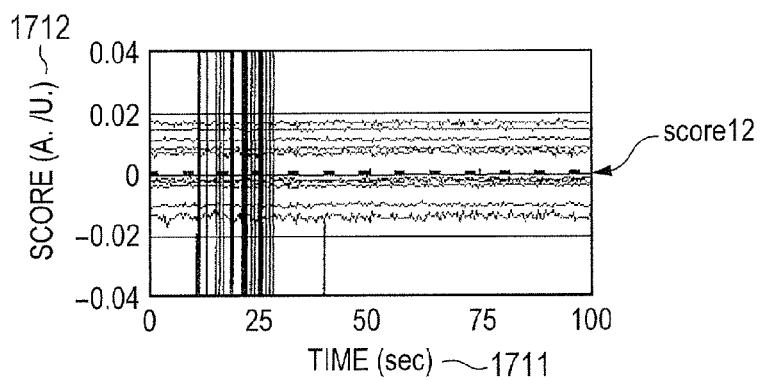

FIGS. 17A and 17B show graphs of MDS scores over the processing time displayed on the screen-user interface 112 by the characteristic signal waveform (principal component vector, MDS score) display section 712. The first to twelfth MDS scores are shown. FIG. 17A is the graph showing all the waveforms of the MDS scores, and FIG. 17B is the graph with a range of MDS score values enlarged at an area near zero. It is proved that the first MDS score score01 has characteristics including hunting and signal intensity shift. Moreover, it is proved that the second to the eleventh MDS scores have a characteristic of signal intensity shift. The MDS scores after the twelfth one are zero. Since the first MDS score has the characteristics including the hunting and the signal intensity shift, a characteristic waveform pattern included in the plurality of signals can be confirmed with only this MDS score.

With the inter-signal multi-dimensional scaling IS-MDS and the inter-time-point multi-dimensional scaling IT-MDS, fault detection can be automatically performed in the feature space based on the MDS map, and also the characteristic signal waveform included in the signal can be extracted.

Second Embodiment

Figure 18:
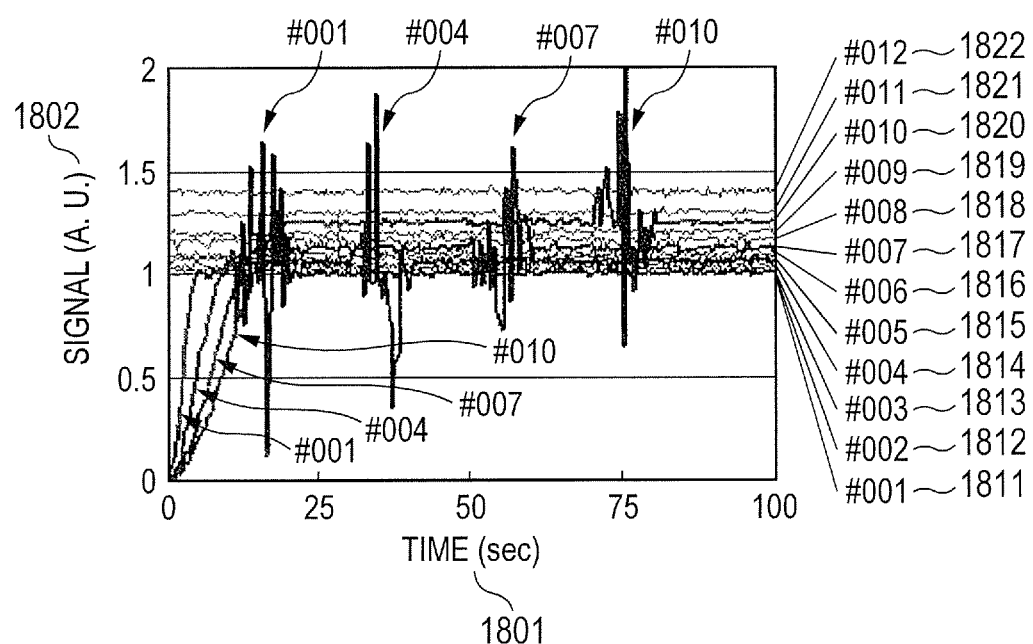
FIG. 18 is a diagram showing an example of signals.

A method of arranging in the feature space each of the signals subjected to the 12 times of processing shown in FIG. 18 and extracting characteristic waveform patterns included in the signals are shown. The signal intensity of each signal shifts in a positive direction every process processing, and further hunting occurs near 15 seconds, 35 seconds, 55 seconds, and 75 seconds for the signals #001, 1811, #004 1814, #007 1817, and #010 1820. There is delayed start from 0 seconds, i.e., a start point of analysis target for the signals #001 1811, #004 1814, #007 1817, and #010 1820. The delay increases in order of #001 1811, #004 1814, #007 1817, and #010 1820. Due to this delay, there is correlation between the signals for the four signals.

Indicated in this embodiment is that, regardless of whether or not there is correlation between the signals over the time points, by the inter-time-point principal component analysis IT-PCA, the inter-signal multi-dimensional scaling IS-MDS, and the inter-time-point multi-dimensional scaling IT-MDS as the methods according to the invention, the fault determination in the feature space can automatically be performed, and the characteristic signal waveform included in the signal can be extracted.

A method of converting a plurality of signals into a feature space and a method of extracting a waveform pattern according to the inter-time-point principal component analysis IT-PCA will be shown. A calculation method is the same as that shown in a first embodiment.

FIG. 19 shows a table of contribution ratios CR 1902 shown in descending order together with cumulative contribution ratios CCR 1903. The contribution ratio of the first principal component is 80%, which is a large proportion, that of the second principal component is 12%, and those from the third principal component to the fifth principal component are several percentages. That is, it is proved that the waveform pattern in the signal has contributions up to the fifth principal component. Those thereafter have no contribution.

Figure 20A:
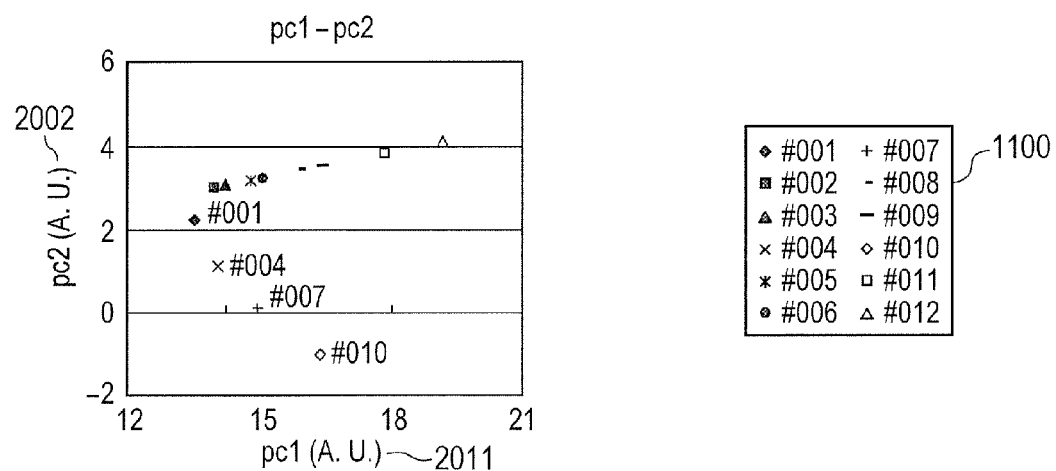
FIGS. 20A to 20C are diagrams showing examples of plots of principal component scores according to the inter-time-point principal component analysis IT-PCA.
Figure 20B:
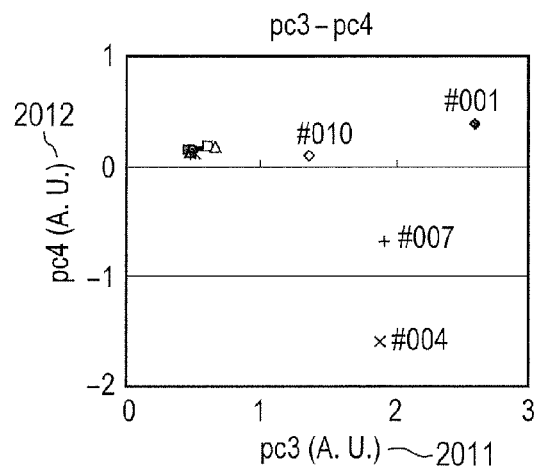
Figure 20C:
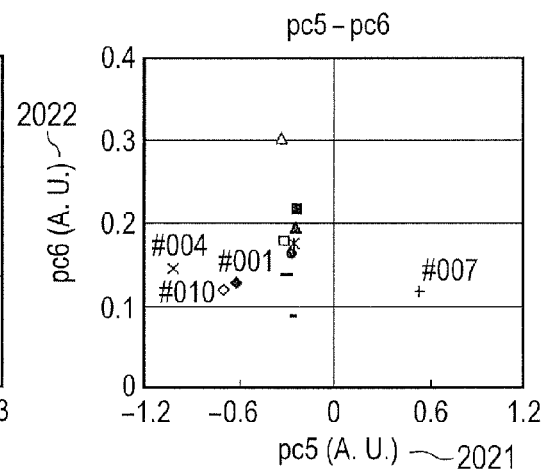
Figure 21A:
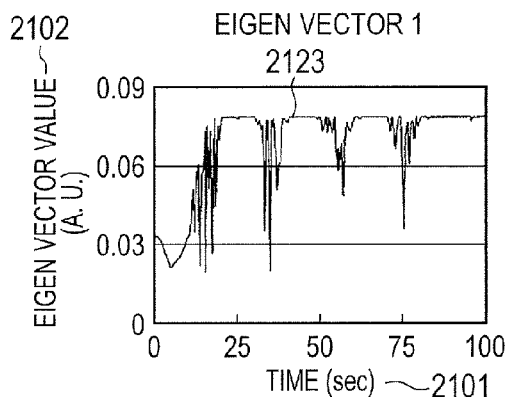
FIGS. 21A to 21F are diagrams showing examples of principal component vector values with respect to time according to the inter-time-point principal component analysis IT-PCA.
Figure 21B:
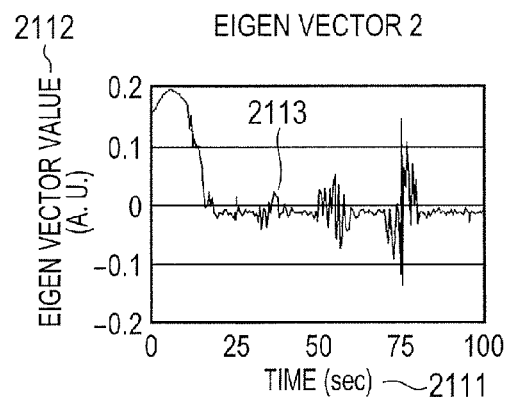
Figure 21C:
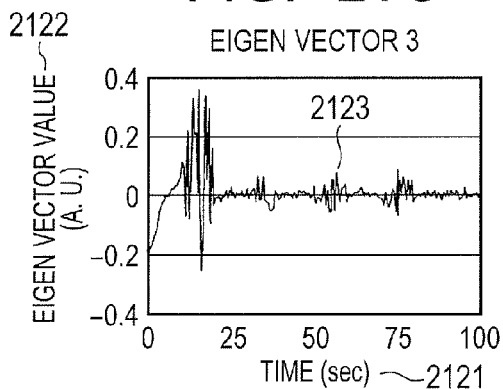
Figure 21D:
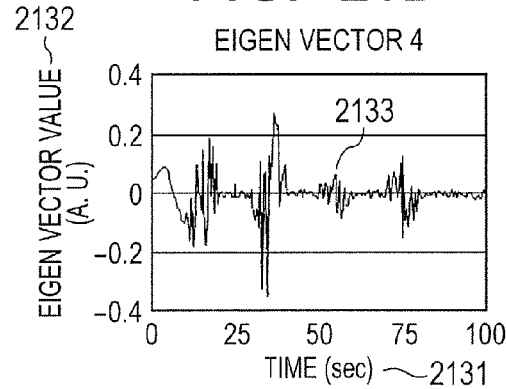
Figure 21E:
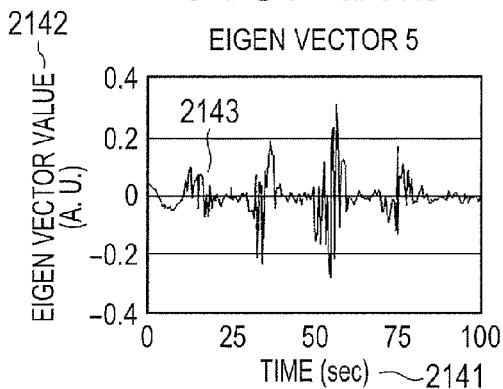
Figure 21F:
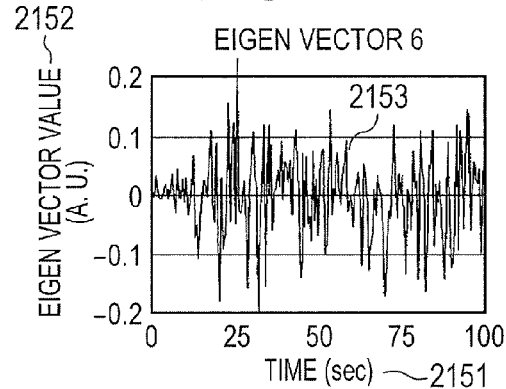

FIGS. 20A to 20C show plots of principal component scores of signals displayed at the screen-user interface 112 by the feature space (principal component score, MDS map) display section 711. FIG. 20A is a scatter diagram of the first principal component (pc1) and the second principal component (pc2), FIG. 20B is a scatter diagram of the third principal component (pc3) and the fourth principal component (pc4), and FIG. 20C is a scatter diagram of the fifth principal component (pc5) and the sixth principal component (pc6). The graphs are shown with those up to the fifth principal component (pc5) having contribution. They prove that intensity change as a result of shift is expressed in pc1 and that difference due to delay and hunting is expressed in pc2. The signals #001, #004, #007, and #010 are arrayed in a negative direction of pc2 in particular, and thus it can be assumed that the difference due to the delay in particular is reflected well. Expressed in pc3 is whether or not there is hunting, and there is difference between #004 and #007 in particular in pc4. Moreover, in pc5, for the signals with only shift, those with hunting scatter in positive and negative directions. The contribution ratio of the sixth principal component is zero, and thus there is no meaning in signal arrangement of pc6. Therefore, comparing values of the first to fifth principal components between the signals and determining difference permits automatic judgment on whether or not a fault has occurred.

FIGS. 21A to 21F show principal component vectors over the processing time displayed at the screen-user interface 112 by the characteristic signal waveform (principal component vector, MDS score) display section 712. FIGS. 21A to 21F respectively show eigen vectors of the first to sixth principal components. In the eigen vector 1, an average is not zero but approximately 0.06, thus proving that there is signal intensity difference between the signals. In the eigen value 2, a waveform of hunting enters, a waveform change of delayed start strongly appears and also the intensity of the hunting of #010 strongly appears. The hunting of #001 strongly appears in the eigen vector 3, the hunting of #004 strongly appears in the eigen vector 4, and the hunting of #007 strongly appears in the eigen vector 5. The eigen vector 6 having no contribution varies randomly. Observing the eigen vectors 1 to 5 permits understanding of characteristic waveform patterns of the signals.

Next, a method of transforming a plurality of signals into a feature space according to the inter-signal multi-dimensional scaling IS-MDS will be shown. Details of calculation by the calculator are the same as that of the first embodiment.

FIG. 22 shows a list of eigen values calculated by the inter-signal multi-dimensional scaling IS-MDS. They are 60%, 30%, 5%, 3%, and 2% in order of the first to fifth principal components. Those thereafter have no contribution.

Figure 23A:
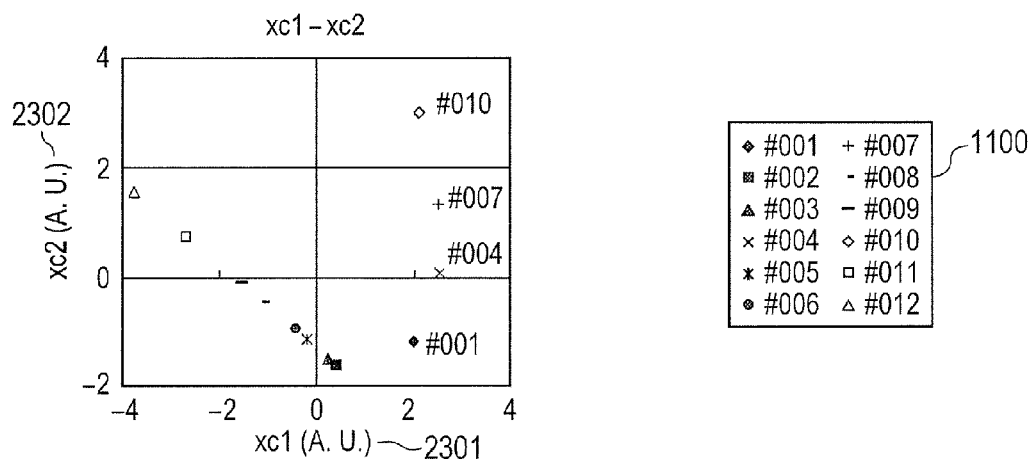
FIGS. 23A to 23C are diagrams showing examples of MDS maps according to the inter-signal multi-dimensional scaling IS-MDS.
Figure 23B:
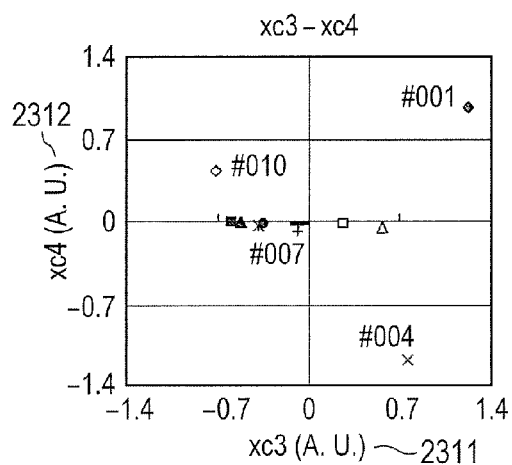
Figure 23C:
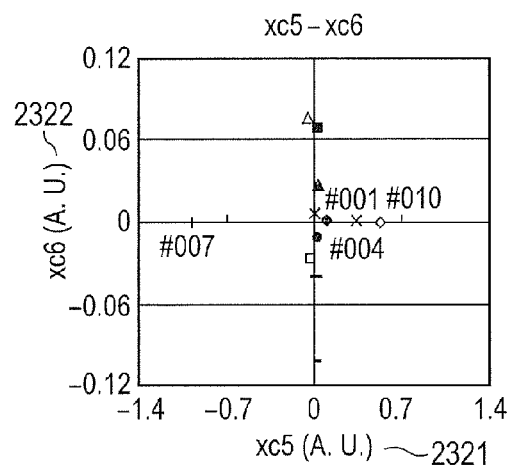

FIGS. 23A to 23C show MDS maps as the feature spaces. FIG. 23A is a plot for a first axis xc1 and a second axis xc2, FIG. 23B is a plot for a third axis xc3 and a fourth axis xc4, and FIG. 23C is a plot for a fifth axis xc5 and a sixth xc6. For the first axis, the signals with hunting and delayed start are arrayed at xc1=2, but the other signals are arrayed in a negative direction. Moreover, for the second axis, shift in signal intensity occurs in a positive direction. However, values of xc2 do not correspond to each other between the signals with and without hunting and delayed start at the second axis. Based on the above, both the first and second axes include influence of the shift in the signal intensity, the delayed start, and the hunting. At the third and fourth axes, difference between the signals #001, #004, and #010 appears, and at the fifth axis, mainly difference in the signal #007 appears. Determining the difference or distance in the MDS map between the signals with and without delayed start and hunting permits automatic judgment on whether or not a fault has occurred.

A method of extracting a waveform pattern included in a plurality of signals according to the inter-time-point multi-dimensional scaling IT-MDS will be shown. A calculation method is the same as the method shown in the first embodiment.

FIG. 24 shows a list of eigen values. Contribution of the first eigen value is as great as 83%, that of the second eigen value is 10%, and those of the third eigen value and the fourth eigen value are 5% and 3%, respectively. Those thereafter have no contribution.

Figure 25A:
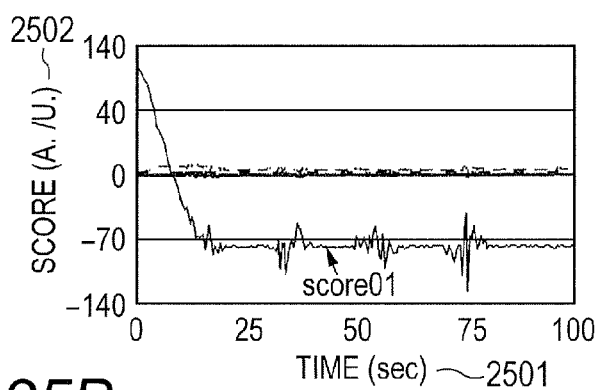
FIGS. 25A to 25C are diagrams showing examples of MDS scores with respect to time according to the inter-point multi-dimensional scaling IS-MDS.
Figure 25B:
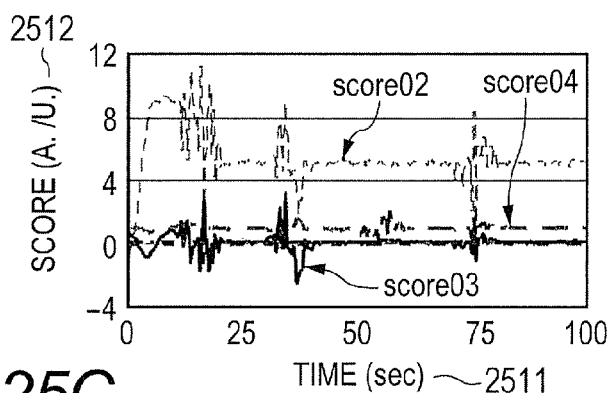
Figure 25C:
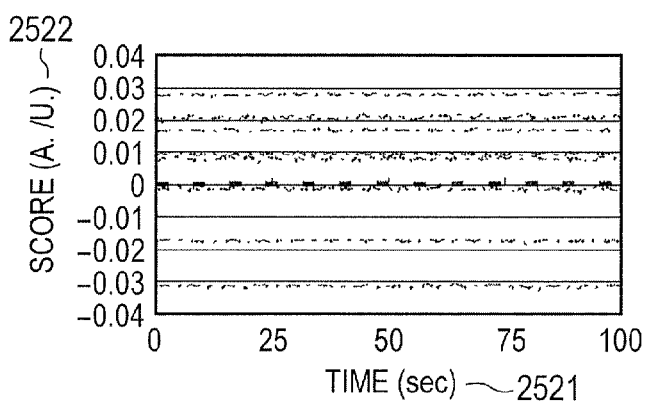

FIGS. 25A to 25c show graphs of MDS scores over the processing time. The first to thirteenth MDS scores are shown. FIG. 25A is the graph showing full-waveforms of the MDS scores. FIG. 25B is the graph where a vertical axis Score (A.U.) 2512 is at [−4, 12], and FIG. 25C is the graph where a vertical axis Score (A.U.) 2522 is at [−0.04, 0.04]. In FIG. 25B, the score 01 is not drawn, and in FIG. 250, the scores 01, 02, 03, and 04 are not drawn. In the first MDS score01, characteristics including intensity shift, delayed start, and hunting appear. In the second MDS score02 and the fourth MDS score04, intensity shift and hunting mainly appear. In the third MDS score03, hunting appears. In the fifth to twelfth MDS scores05 to scores12, a characteristic of intensity shift appears although the MDS score values are very small. Only with the first MDS score having great contribution, a characteristic waveform pattern of the delayed start, the hunting, and the intensity shift can be confirmed. Alternatively, those up to the fourth MDS scores whose contributions are not zero may be put into a graph to confirm the characteristic waveform patterns.

It is proved that also in this embodiment, with the inter-signal multi-dimensional scaling IS-MDS and the inter-time-point multi-dimensional scaling IT-MDS, a fault can automatically be determined in the feature space based on the MDS map and the characteristic signal waveform included in the signal can be extracted.

Third Embodiment

Illustrated in this embodiment are examples of a method of performing fault detection and display of analysis results onto the screen-user interface.

Fault detection processing is identifying a faulty signal by determining arrangement relationship between a plurality of signals in a feature space which is defined as a principal component score in the inter-time-point principal component analysis IT-PCA and is defined as an MDS map in the inter-signal multi-dimensional scaling IS-MDS. The arrangement relationship between the plurality of signals in the feature space is, for example, the plots of the principal component scores shown in FIGS. 11A and 11B and FIG. 20 and the plots of the MDS maps shown in FIGS. 15A and 15B and FIGS. 23A to 23C.

Here, a method of fault determination for one principal component score will be described.

Figure 26A:
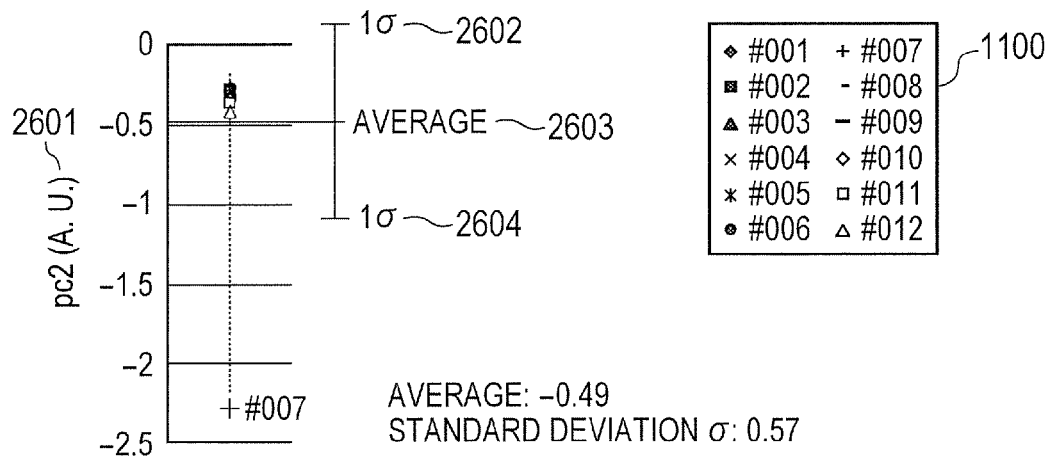
FIGS. 26A and 26B are diagrams showing examples of signal distribution in one principal component for illustrating a fault detection method.
Figure 26B:
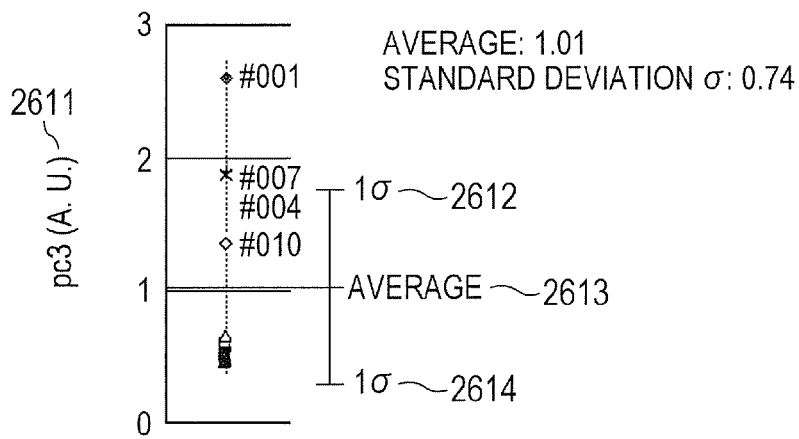

FIG. 26A shows distribution of signals with the second principal component pc2 calculated by the inter-time-point principal component analysis IT-PCA of the first embodiment. FIG. 26B shows distribution of signals with the third principal component calculated by the inter-time-point principal component analysis IT-PCA of a second embodiment.

In the distribution of FIG. 26A, all the signals excluding the signal #007 are included in a range within +1σ2602 and −1σ2604 of an average 2603 of all the signals. That is, the signal #007 is peculiar to the other signals. Thus, to determine that a fault has occurred, defining that there is no fault if formula 14 is satisfied, a faulty signal may be obtained.

$$\bar{x}_i - \sigma_i \leq x_{ij} \leq \bar{x}_i + \sigma_i \qquad \text{[Formula 14]}$$

Here, "x" is a principal component score or an MDS map value and "i" is a principal component number or an axis number of the MDS map. Letter "j" is an index meaning a signal. A bar "-" on a variable means an average. Moreover, "σ" is standard deviation. There is no need of limiting the range at 1σ, and the range may be typically defined by a positive number (real number) k.

$$\bar{x}_i - k\sigma_i \leq x_{ij} \leq \bar{x}_i + k\sigma_i \qquad \text{[Formula 15]}$$

In FIG. 26B, according to formula 14, the signals #001, #004, and #007 are determined to be faulty. Checking FIGS. 20A to 20C proves that the signal #010 is most distant from the average in the second principal component pc2 (A.U.) 2002. Changing the principal component or the axis of the MDS map in this manner permits determination of a faulty signal. The axis to be evaluated may be judged based on an eigen value obtained through calculation, and for example, for the inter-time-point principal component analysis IT-PCA in the first embodiment, those up to the second principal component having contribution may be evaluated based on FIG. 10. For the inter-time-point principal component analysis IT-PCA in the second embodiment, those up to the fifth principal components may be evaluated based on FIG. 19.

It is also possible to, defining the number of principal components targeted for fault evaluation or the number of axes of the MDS map as up to 1, make fault determination on a plurality of principal components or a plurality of the axes of the MDS map based on multivariate principal component scores or vectors of MDS map values. In this case, if formula 16 is satisfied, it may be assumed that there is no fault, and a faulty signal may be obtained.

$$(x_j-\bar{x})^T S^{-1}(x_i-\bar{x}) \leq (k\sigma)^T S^{-1}(k\sigma) \quad \text{[Formula 16]}$$

Here, "x" is a principal component score whose number of devices is 1 or a vector of an MDS map value. A bar "-" on the vector means a vector obtained by acquiring an average of signals for each device. Symbol "σ" is a vector of standard deviation between the signals for each principal component or each axis of the MDS map. Letter "S" is a 1×1 sample variation-covariation matrix of principal component scores of the signal or MDS map values.

If a criterion for determination whether a signal is faulty or correct can be previously determined based on a past case as a method of determining a fault in the signal in a feature space, discrimination analysis or a support vector machine SVM may be used.

Figure 27:
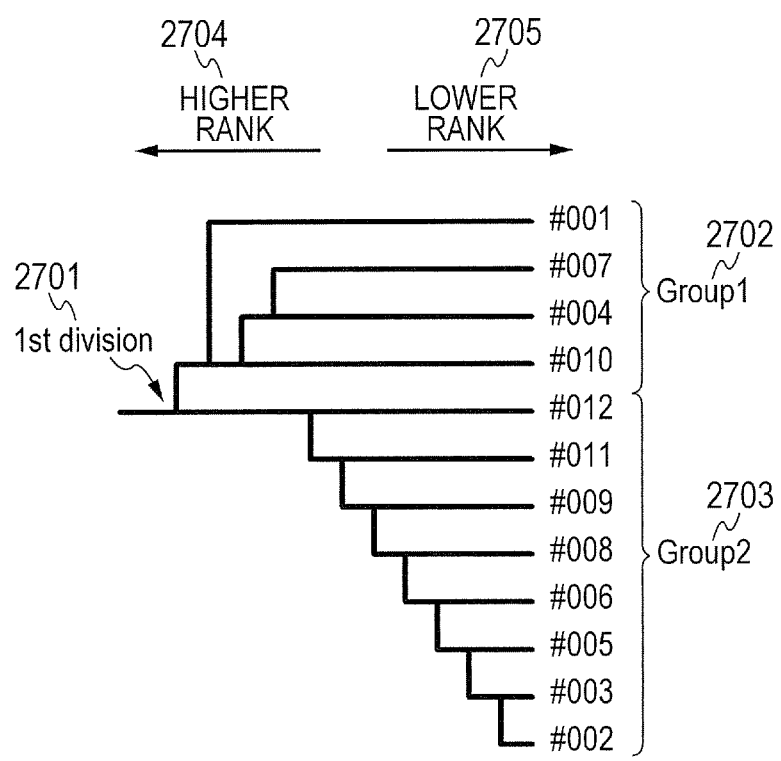
FIG. 27 is a tree diagram (dendrogram) showing an example of hierarchy relationship in signal similarity in one principal component for illustrating the fault detection method.

Moreover, to determine a fault in the signal in the feature space, there is a way of using group classification. FIG. 27 shows a signal dendrogram according to cluster analysis using the third principal component of the inter-time-point principal component analysis IT-PCA shown in FIG. 26B. According to this, by a first division 2701, the signals #001, #004, #007, and #010 are separated as Group 1 2702 from the other signals as Group 2 2703. The numbers of signals may be compared to each other and the group with the smaller number of signals may be determined to be faulty. The fault determination can be made through grouping by division at an upper level 2704 in this manner. As a method of the group classification, in addition to the cluster analysis, a k-means method can be used.

Next, contents of display of analysis results at the screen-user interface will be shown. This display may be processed regardless of whether or not these is a fault, and may be provided every process processing. Moreover, fault occurrence does not necessarily have to be checked by the user on the screen, but an alarm by an e-mail or a sound such as a siren sound may be provided.

Figure 28:
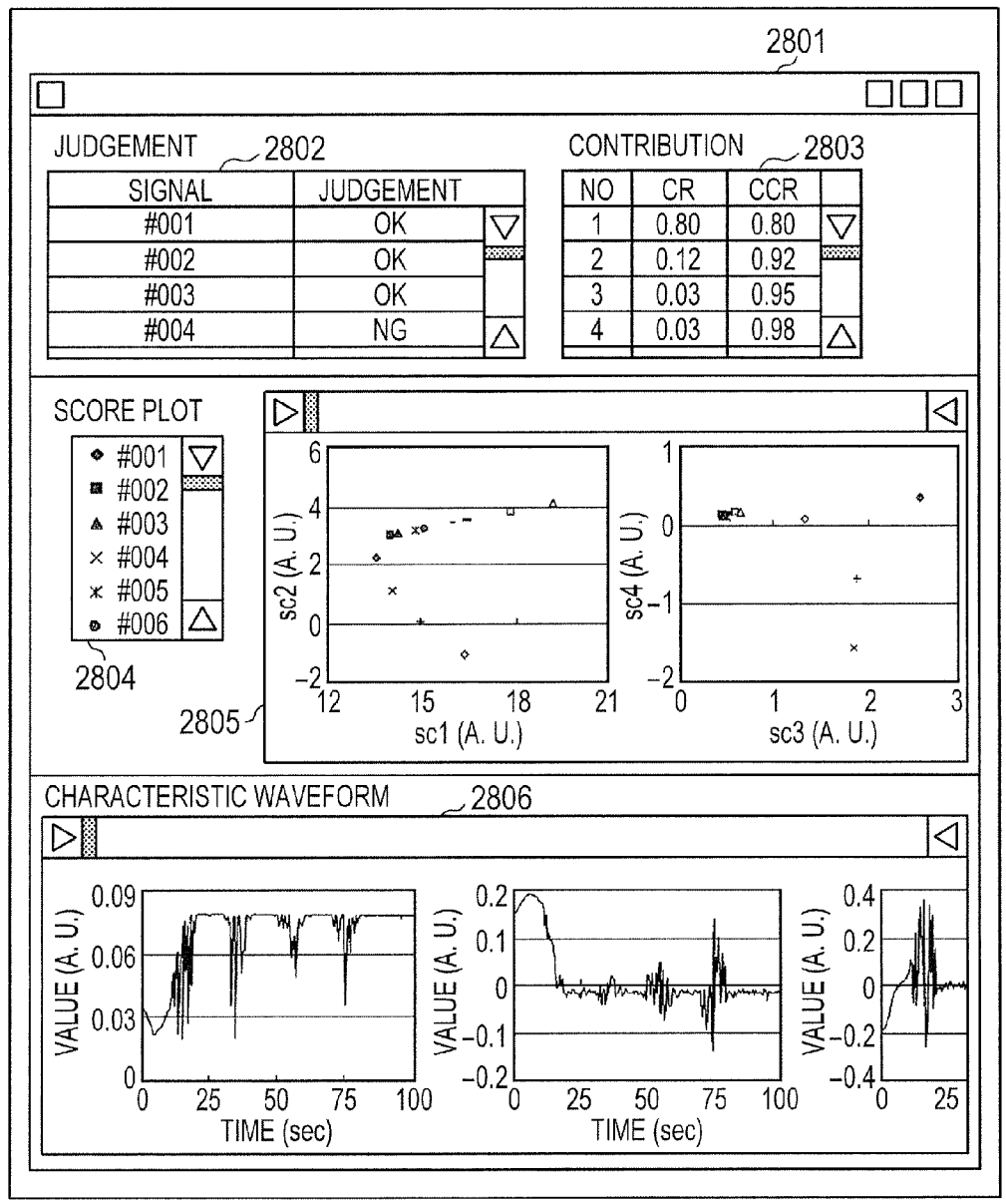
FIG. 28 is a diagram showing an example of display of analysis results on a screen-user interface.

FIG. 28 shows an example of screen display. Displayed on the screen 2801 are: fault determination results 2802, a contribution ratio list 2803 provided by eigen values, plots 2805 of signals in a feature space, a legend 2804 of a signal plot, and a characteristic waveforms 2806 of the signal. Based on these pieces of information, fault occurrence and the characteristics of the waveforms included in the signal at that time can be confirmed by the user.

These pieces of information, in case of the inter-time-point principal component analysis IT-PCA, permits display of the contribution ratio list 2803, the plots 2805 of the signal in the feature space, and the characteristic waveforms 2806 of the signals by the eigen values, the principal component scores, and the principal component vectors, respectively.

To perform analysis by the multi-dimensional scaling, the contribution ratio list 2803 and the plots 2805 of the signal in the feature space can be respectively displayed by the eigen values and the MDS map provided by the inter-signal multi-dimensional scaling IS-MDS, and the characteristic waveforms 2806 of the signal can be displayed by the MDS scores provided by the inter-time-point multi-dimensional scaling IT-MDS. The eigen values provided by the inter-time-point multi-dimensional scaling IT-MDS may also be included in the contribution ratio list 2803.

Alternatively, all information of the inter-time-point principal component analysis IT-PCA, the inter-signal multi-dimensional scaling IS-MDS, and the inter-time-point multi-dimensional scaling IT-MDS may be displayed. For a format of display of each piece of information, a device of each screen of FIG. 28 may be provided.

Contents of processing of the semiconductor manufacturing equipment provided with a monitoring method according to the invention have been described above.

The invention relates to the semiconductor manufacturing equipment, but the calculation methods themselves of the inter-time-point principal component analysis IT-PCA, the inter-signal multi-dimensional scaling IS-MDS, and the inter-time-point multi-dimensional scaling IT-MDS are applicable to analysis of all signals and further typically a plurality of data items having the same number of data points. These calculation methods themselves are not limited to the semiconductor manufacturing equipment.

Fourth Embodiment

In this embodiment, configuration in a case where equipment monitoring processing of the semiconductor manufacturing equipment 601 is executed by the equipment data monitoring equipment 133 connected via the network 131 shown in FIG. 6 will be described.

Shown in the first embodiment is an example in which all functions related to the equipment monitoring processing are executed in the semiconductor manufacturing equipment monitoring processing arithmetic section 701 as the calculator-storage device 111 provided in the semiconductor manufacturing equipment 601. Moreover, an example in which the device data DB 132 is included in the calculator-storage device 111 has been described.

The equipment data monitoring device 133 of this embodiment includes the semiconductor manufacturing equipment monitoring processing arithmetic section 701 shown in FIG. 7, and executes the equipment monitoring processing of the plurality of semiconductor manufacturing equipment 601 connected to the network 131. Moreover, the device data DB 132 connected to the network 131 commonly stores the equipment data of the plurality of semiconductor manufacturing equipment 601.

The lot-by-lot and wafer-by-wafer processing log acquisition section 702 of the calculator-storage device 111 of each semiconductor manufacturing equipment 601 acquires, as equipment data of a predetermined sampling interval, output signals of the equipment controllers 611 to 615 and the in-processing sensors 621 to 623, and stores them into the device data DB 132 via the network 131.

The equipment data monitoring device 133 searches and reads out from the device data DB 132 the equipment data stored for each semiconductor manufacturing equipment 601, and executes the equipment monitoring processing of each semiconductor manufacturing equipment 601 in the same manner as that for the processing described in the first, second and third embodiments. Then results of processing are outputted to an output section not described in FIGS. 6 and 7, or all the results of processing are transmitted to the calculator-storage device 111 of the corresponding semiconductor manufacturing equipment 601.

The calculator-storage device 111 which has received data of the equipment monitoring processing results displays and outputs it onto the screen-user interface 112 by each display processing section and the fault detection section 714.

Note that the equipment data monitoring device 133 does not necessarily have to be installed, for example, near the equipment, and may be installed in a building such as a data center. Outputting of the processing results does not have to be performed at the screen-user interface 112, but may be performed at an office PC (personal computer) terminal screen-user interface. This permits simultaneous management of a plurality of equipment on the same screen.

What is claimed is:

1. Semiconductor manufacturing equipment including configuration for realizing wafer process processing and preparatory processing, the semiconductor manufacturing equipment comprising:
    a controller controlling driving and processes of various parts of the semiconductor manufacturing equipment, and a sensor monitoring each physical amount in the semiconductor manufacturing equipment or a status of each chemical response amount;
    a database storing equipment data obtained by sampling, at predetermined intervals, output signals of the controller and the sensor of the semiconductor manufacturing equipment being manufactured; and
    an arithmetic section executing: processing of searching the database for the equipment data of the semiconductor manufacturing equipment to be evaluated, reading out the equipment data to be analyzed, calculating a correlation matrix between time points based on a plurality of pieces of signal data to be compared, calculating eigen values and eigen vectors from the correlation matrix, and calculating principal component scores by principal component analysis; processing of comparing magnitudes of the eigen values of the principal components, arranging the eigen values in descending order to display a list thereof on a user interface screen, thereby enabling determination of the eigen value having a contribution ratio; and processing of displaying on the user interface screen a scatter diagram where the principal component scores of the respective signals are plotted in a feature space where the principal component corresponding to the eigen value having the contribution ratio is selected.

2. The semiconductor manufacturing equipment according to claim 1,
    wherein the arithmetic section further executes processing of displaying on the user interface screen a graph of the principal component vectors corresponding to the eigen values having the contribution ratios with processing time plotted at a horizontal axis in order of vector element numbers and with vector values plotted at a vertical axis.

3. The semiconductor manufacturing equipment according to claim 1,
    wherein the arithmetic section further determines a fault and outputs an fault occurrence alarm in a case where, with a previously inputted fault detection determination criterion being defined as a threshold, difference in principal component score value between the signals exceeds the threshold.

4. The semiconductor manufacturing equipment according to claim 1,
    wherein the arithmetic section, upon detecting signal change based on similarity between the signals by using transformation values as the principal component scores, obtains, in descending order of contribution ratios ($eigen_{values}$) of the principal component analysis, the number n of principal components until reach of a specified accumulated contribution ratio, and evaluates the similarity by using values of the principal components from the first principal component to the n-th principal component score.

5. The semiconductor manufacturing equipment according to claim 1,
    wherein the arithmetic section further sequentially selects the principal component in corresponding to the eigen value having the contribution ratio, calculates, based on the principal component scores $X_{ij}$ (where j is an index meaning a signal) of all the signals with respect to the principal component i, an average $x_i$ ("-" on a variable means the average) and standard deviation $\sigma_i$, determines that the signal not satisfying a formula below is a faulty signal:

$$\bar{x}_i - k\sigma_i \leq x_{ij} \leq \bar{x}_i + k\sigma_i \qquad \text{[Formula 1]}$$

where k is a positive number (real number), and outputs information specifying the signal determined to be faulty.

6. The semiconductor manufacturing equipment according to claim 1,
    wherein the arithmetic section is divided into: a first arithmetic subsection included in the semiconductor manufacturing equipment; and a second arithmetic subsection included in equipment data monitoring equipment connected via a network,
    the database is installed in a manner such as to be connected to the semiconductor manufacturing equipment via the network,
    the first arithmetic subsection records, onto the database via the network and the second arithmetic subsection, the equipment data obtained by sampling the output signals of the controller and the sensor of the semiconductor manufacturing equipment,
    the second arithmetic subsection searches the database for the equipment data of the semiconductor manufacturing equipment to be evaluated, reads out the equipment data to be analyzed, quantitatively transforms characteristic change difference between a plurality of pieces of diagonal data to be compared, executes processing of specifying, based on the similarity between the signals by using a value of the transformation, the signal that can be identified as being faulty, and transmits to the first arithmetic subsection output put into a graph of quantitative values between the plurality of signals and alarm output provided by fault detection, and
    the first arithmetic subsection further outputs onto the user interface screen the graph information and the fault detection alarm information received from the second arithmetic subsection.

7. A semiconductor manufacturing equipment including configuration for realizing wafer process processing and preparatory processing, the semiconductor manufacturing equipment comprising:
    a controller controlling driving and processes of various parts of the semiconductor manufacturing equipment, and a sensor monitoring each physical amount in the semiconductor manufacturing equipment or a status of each chemical response amount;
    a database storing equipment data obtained by sampling, at predetermined intervals, output signals of the controller and the sensor of the semiconductor manufacturing equipment being manufactured; and
    an arithmetic section executing: processing of searching the database for the equipment data of the semiconductor manufacturing equipment to be evaluated, reading out the equipment data to be analyzed, between any two of a plurality of pieces of signal data to be compared, defining as distance between the signals a sum of squares of signal intensity difference over different sampling time points, obtaining a distance matrix and an inner product matrix, calculating eigen values and eigen vectors of the inner product matrix, and calculating a coordinate value of each signal in a multi-dimensional scaling (MDS) map by multi-dimensional scaling; processing of comparing magnitudes of the eigen values corresponding to the respective signals and arraying the magnitudes in descending order to display a list thereof on a user interface screen, thereby enabling determination of the eigen values having contribution ratios; and processing of displaying on the user interface screen a scatter diagram plotting a coordinate value of each signal in a feature space where an MDS map coordinate axis corresponding to one of the eigen values having one of the contribution ratios is selected.

8. The semiconductor manufacturing equipment according to claim 7,
wherein the arithmetic section further determines a fault and outputs an fault occurrence alarm in a case where, with a previously inputted fault detection determination criterion being defined as a threshold, difference in MDS map coordinate value between the signals exceeds the threshold.

9. The semiconductor manufacturing equipment according to claim 7,
wherein the arithmetic section, by using transformation values as the coordinate values, upon detecting signal change based on similarity between the signals, obtains the number n of dimensions in descending order of the contribution ratios (eigen values) of the multi-dimensional scaling until reach of a specified accumulated contribution ratio, and uses the coordinate values for a first axis (the first dimension) to an n-th axis (the n-th dimension) to evaluate the similarity.

10. The semiconductor manufacturing equipment according to claim 7,
wherein the arithmetic section further sequentially selects the coordinate axis i corresponding to the eigen value having the contribution ratio, calculates, based on MDS map values $X_{ij}$ (where j is an index meaning a signal) of all the signals with respect to the corresponding MDS map coordinate axis i, an average $X_i$ ("-" on a variable means the average) and standard deviation $\sigma_i$, determines that the signal not satisfying a formula below is a faulty signal:

$$\bar{x}_i - k\sigma_i \leq x_{ij} \leq \bar{x}_i + k\sigma_i \quad \text{[Formula 2]}$$

where k is a positive number (real number), and outputs information specifying the signal determined to be faulty.

11. The semiconductor manufacturing equipment according to claim 7,
wherein the arithmetic section is divided into: a first arithmetic subsection included in the semiconductor manufacturing equipment; and a second arithmetic subsection included in equipment data monitoring equipment connected via a network,
the database is installed in a manner such as to be connected to the semiconductor manufacturing equipment via the network,
the first arithmetic subsection records, onto the database via the network and the second arithmetic subsection, the equipment data obtained by sampling the output signals of the controller and the sensor of the semiconductor manufacturing equipment,
the second arithmetic subsection searches the database for the equipment data of the semiconductor manufacturing equipment to be evaluated, reads out the equipment data to be analyzed, quantitatively transforms characteristic change difference between a plurality of pieces of diagonal data to be compared, executes processing of specifying, based on the similarity between the signals by using a value of the transformation, the signal that can be identified as being faulty, and transmits to the first arithmetic subsection output put into a graph of quantitative values between the plurality of signals and alarm output provided by fault detection, and
the first arithmetic subsection further outputs onto the user interface screen the graph information and the fault detection alarm information received from the second arithmetic subsection.

12. Semiconductor manufacturing equipment including configuration for realizing wafer process processing and preparatory processing, the semiconductor manufacturing equipment comprising:
a controller controlling driving and processes of various parts of the semiconductor manufacturing equipment, and a sensor monitoring each physical amount in the semiconductor manufacturing equipment or a status of each chemical response amount;
a database storing equipment data obtained by sampling, at predetermined intervals, output signals of the controller and the sensor of the semiconductor manufacturing equipment being manufactured; and
an arithmetic section executing: processing of searching the database for the equipment data of the semiconductor manufacturing equipment to be evaluated, reading out the equipment data to be analyzed, from a plurality of pieces of signal data to be compared, taking and squaring difference of the same signal between sampling time points, defining a sum for all the signals as distance between the time points, calculating a distance matrix and
an inner product matrix based on distance relationship between the time points, calculating eigen values and eigen vectors of the inner product matrix, and calculating multi-dimensional scaling (MDS) scores based on a coordinate value matrix and a distance matrix of a feature space according to multi-dimensional scaling; processing of comparing magnitudes of the eigen values corresponding to the respective signals and arraying the magnitudes in descending order to display a list thereof on a user interface screen, thereby enabling determination of the eigen values having contribution ratios; and processing of displaying on the user interface screen a waveform graph of MDS scores corresponding to the eigen values having the contribution ratios with processing time plotted in order of vector device numbers at a horizontal axis and with values of the MDS scores plotted at a vertical axis.

13. The semiconductor manufacturing equipment according to claim 12,
wherein the arithmetic section, upon detecting signal change based on similarity between the signals by using the MDS scores as characteristics of the signals for the respective axes of the feature space, obtains, in descending order of contribution ratios (eigen values) of inter-time-point multi-dimensional scaling, the number n of dimensions until reach of a specified cumulative contribution ratio, and uses the MDS scores of the signals for the first (first dimension) to n-th (n-th dimension) axes to evaluate the similarity.

14. The semiconductor manufacturing equipment according to claim 12,
wherein the arithmetic section is divided into: a first arithmetic subsection included in the semiconductor manufacturing equipment; and a second arithmetic subsection included in equipment data monitoring equipment connected via a network, the database is installed in a manner such as to be connected to the semiconductor manufacturing equipment via the network, the first arithmetic subsection records, onto the database via the network and the second arithmetic subsection, the equipment data obtained by sampling the output signals of the controller and the sensor of the semiconductor manufacturing equipment, the second arithmetic subsection searches the database for the equipment data of the semiconductor manufacturing equipment to be evaluated, reads out the equipment data to be analyzed, quantitatively transforms characteristic change difference between a plurality of pieces of diagonal data to be compared, executes processing of specifying, based on the similarity between the signals by using a value of the transformation, the signal that can be identified as being faulty, and transmits to the first arithmetic subsection output put into a graph of quantitative values between the plurality of signals and alarm output provided by fault detection, and the first arithmetic subsection further outputs onto the user interface screen the graph information and the fault detection alarm information received from the second arithmetic subsection.

* * * * *